(12) United States Patent
Fujiwara

(10) Patent No.: US 10,194,095 B2
(45) Date of Patent: Jan. 29, 2019

(54) IMAGE PROCESSING SENSOR SYSTEM, IMAGE PROCESSING SENSOR CONTROL METHOD, AND IMAGE PROCESSING SENSOR USED IN IMAGE PROCESSING SENSOR SYSTEM

(71) Applicant: Keyence Corporation, Osaka (JP)

(72) Inventor: Kaoru Fujiwara, Osaka (JP)

(73) Assignee: Keyence Corporation, Osaka (JP)

( * ) Notice: Subject to any disclaimer, the term of this patent is extended or adjusted under 35 U.S.C. 154(b) by 526 days.

(21) Appl. No.: 14/328,745

(22) Filed: Jul. 11, 2014

(65) Prior Publication Data

US 2015/0042788 A1 Feb. 12, 2015

(30) Foreign Application Priority Data

Aug. 12, 2013 (JP) ................................. 2013-167906

(51) Int. Cl.
  *H04N 5/225* (2006.01)
  *H04N 5/232* (2006.01)
  *H04N 5/235* (2006.01)

(52) U.S. Cl.
  CPC ......... *H04N 5/2354* (2013.01); *H04N 5/2256* (2013.01); *H04N 5/2258* (2013.01); *H04N 5/232* (2013.01); *H04N 5/23206* (2013.01)

(58) Field of Classification Search
  None
  See application file for complete search history.

(56) References Cited

U.S. PATENT DOCUMENTS

| | | | | | |
|---|---|---|---|---|---|
| 4,348,740 | A | * | 9/1982 | White | G06Q 99/00 273/237 |
| 4,760,270 | A | * | 7/1988 | Miller | G01N 21/88 250/559.39 |
| 7,102,686 | B1 | * | 9/2006 | Orimoto | G03B 35/08 348/231.7 |
| 7,199,820 | B2 | * | 4/2007 | Oka | H04N 5/073 348/14.09 |

(Continued)

FOREIGN PATENT DOCUMENTS

JP 2013-110513 6/2013

*Primary Examiner* — William C Vaughn, Jr.
*Assistant Examiner* — Lindsay J Uhl
(74) *Attorney, Agent, or Firm* — Kilyk & Bowersox, P.L.L.C.

(57) ABSTRACT

In one aspect of the invention, an image processing sensor system may include a plurality of image processing sensors each including an imaging device having an imaging unit imaging an inspection target and a lighting unit projecting light onto the inspection target, and an image processing device performing image processing on image data acquired in the imaging device and determining whether the inspection target is defective or non-defective, wherein the image processing sensors being are connected to each other so that data communication of data including the image data can be performed therebetween, and wherein a first image processing sensor transmits a signal relating to the completion of projecting light projecting light to a second image processing sensor, and the second image processing sensor starts projecting light and imaging and projection after receiving the signal relating the completion of projecting light.

12 Claims, 21 Drawing Sheets

(56) References Cited

U.S. PATENT DOCUMENTS

| | | | | |
|---|---|---|---|---|
| 7,915,570 | B2* | 3/2011 | Cetrulo | H04N 5/2256 250/205 |
| 9,001,226 | B1* | 4/2015 | Ng | H04N 5/23203 348/211.11 |
| 9,194,814 | B2* | 11/2015 | Numazu | G01N 21/9036 |
| 2010/0176965 | A1* | 7/2010 | Fukumura | H04Q 9/00 340/870.01 |
| 2010/0185418 | A1* | 7/2010 | Fukumura | H04L 12/40013 702/188 |
| 2011/0156640 | A1* | 6/2011 | Moshfeghi | H02J 50/20 320/108 |
| 2011/0157389 | A1* | 6/2011 | McClellan | H04N 5/232 348/222.1 |
| 2011/0187871 | A1* | 8/2011 | Hsieh | H04N 5/247 348/207.1 |
| 2013/0102164 | A1* | 4/2013 | Sip | H01R 13/642 439/38 |
| 2013/0128027 | A1 | 5/2013 | Katsurada et al. | |
| 2014/0293078 | A1* | 10/2014 | Kashiwa | H04N 5/232 348/211.11 |

\* cited by examiner

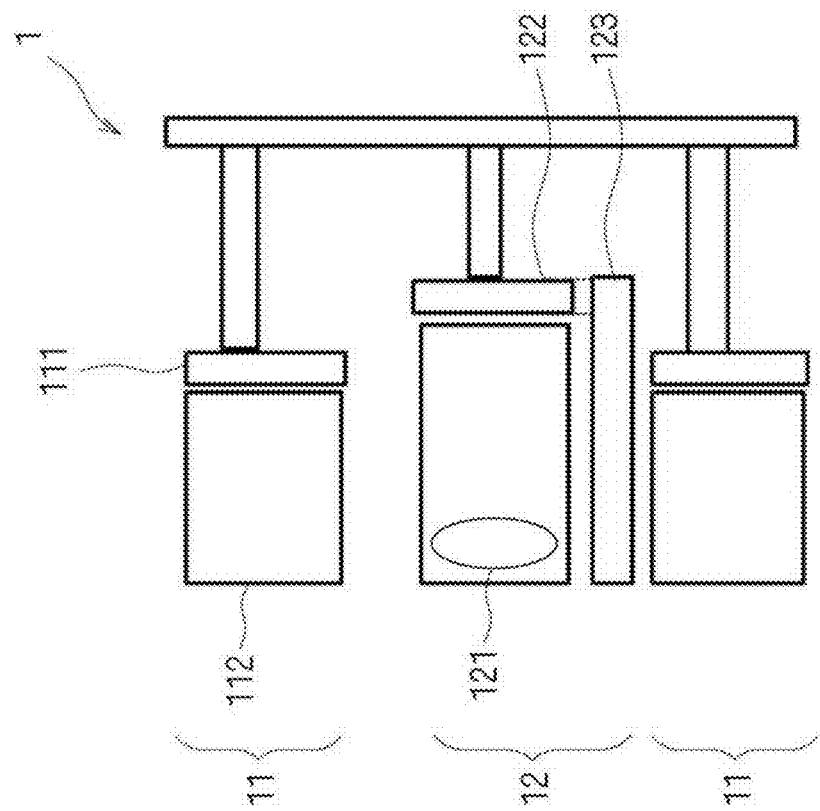
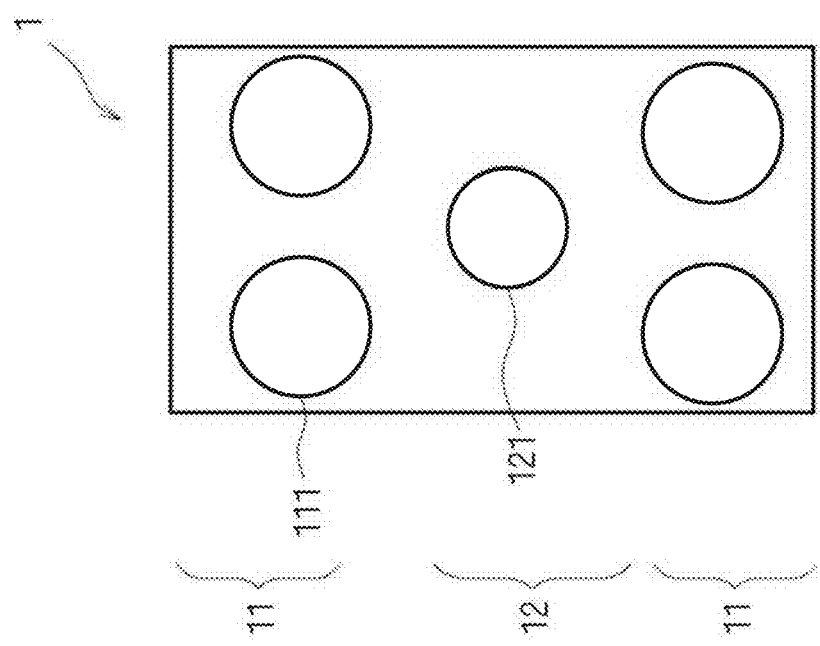

FIG. 12

| RETRIEVAL RESULT | | | | | | |
|---|---|---|---|---|---|---|
| MASTER UNIT | IMAGING DEVICE TYPE | MAC ADDRESS | IP ADDRESS | SUBNET MASK | DEFAULT GATEWAY | |
| | SLAVE UNIT No. 1 | IMAGING DEVICE TYPE | | | | |
| | SLAVE UNIT No. 2 | IMAGING DEVICE TYPE | | | | |
| | SLAVE UNIT No. 3 | IMAGING DEVICE TYPE | | | | |
| MASTER UNIT | IMAGING DEVICE TYPE | MAC ADDRESS | IP ADDRESS | SUBNET MASK | DEFAULT GATEWAY | |
| MASTER UNIT | IMAGING DEVICE TYPE | MAC ADDRESS | IP ADDRESS | SUBNET MASK | DEFAULT GATEWAY | |
| | SLAVE UNIT No. 1 | IMAGING DEVICE TYPE | | | | |
| | SLAVE UNIT No. 2 | IMAGING DEVICE TYPE | | | | |

[CONNECT] [CANCEL]

FIG. 14

RETRIEVAL RESULT

| COMMUNICATION UNIT TYPE | MAC ADDRESS | IP ADDRESS | SUBNET MASK | DEFAULT GATEWAY |
|---|---|---|---|---|

- MASTER UNIT — IMAGING DEVICE TYPE
- SLAVE UNIT No. 1 — IMAGING DEVICE TYPE
- SLAVE UNIT No. 2 — IMAGING DEVICE TYPE
- SLAVE UNIT No. 3 — IMAGING DEVICE TYPE

| COMMUNICATION UNIT TYPE | MAC ADDRESS | IP ADDRESS | SUBNET MASK | DEFAULT GATEWAY |
|---|---|---|---|---|

- MASTER UNIT — IMAGING DEVICE TYPE

| COMMUNICATION UNIT TYPE | MAC ADDRESS | IP ADDRESS | SUBNET MASK | DEFAULT GATEWAY |
|---|---|---|---|---|

- MASTER UNIT — IMAGING DEVICE TYPE
- SLAVE UNIT No. 1 — IMAGING DEVICE TYPE
- SLAVE UNIT No. 2 — IMAGING DEVICE TYPE

[CONNECT] [CANCEL]

FIG. 19

MUTUAL INTERFERENCE PREVENTION COLLECTIVE SETTING

| DEVICE NAME | INTERFERENCE PREVENTION SETTING | |
|---|---|---|
| MASTER UNIT | GROUP 1 | ▽ |
| SLAVE UNIT No. 1 | GROUP 1 | ▽ |
| SLAVE UNIT No. 2 | GROUP 2 | ▽ |
| SLAVE UNIT No. 3 | GROUP 3 | ▽ |
| SLAVE UNIT No. 4 | GROUP 3 | ▽ |
| SLAVE UNIT No. 5 | GROUP 3 | ▽ |

GROUP 1
GROUP 2

CHANGE SETTING      CANCEL

IMAGE PROCESSING SENSOR SYSTEM, IMAGE PROCESSING SENSOR CONTROL METHOD, AND IMAGE PROCESSING SENSOR USED IN IMAGE PROCESSING SENSOR SYSTEM

CROSS-REFERENCE TO RELATED APPLICATIONS

The present application, claims foreign priority based on Japanese Patent Application No. 2013-167906, filed Aug. 12, 2013, the contents of which is incorporated herein by reference.

BACKGROUND OF THE INVENTION

1. Field of the Invention

The present invention relates to an image processing sensor system capable of preventing interference in light projection regions of adjacent image processing sensors, an image processing sensor control method, and an image processing sensor used in the image processing sensor system.

2. Description of Related Art

As an image processing sensor that performs visual inspection of an inspection target, there is one in which a lighting unit and an imaging unit are integrated with each other to pick up an image of the surface of an inspection target. In this type of image processing sensor, image processing is performed on data of the picked-up image of the surface of the inspection target by a semiconductor device built in the image processing sensor. In image processing sensors in which a lighting unit and an imaging unit are integrated with each other, optimal projection timing and optimal imaging timing are set for each of the image processing sensors.

For example, in JP 2013-110513 A discloses a conventional image processing sensor in which a lighting unit and an imaging unit are integrated with each other. In JP 2013-110513 A, the image processing sensor is provided with an imaging device, and connected to a display device (monitor) through a connection cable. Further, a FPGA, DSP or the like which performs image processing is provided as an image processing device inside the imaging device of the image processing sensor. Further, the imaging device is provided with a plurality of LEDs as a lighting unit so as to surround a lens which picks up an image.

However, in the image processing sensor disclosed in JP 2013-110513 A, when a plurality of image processing sensors are adjacently arranged, interference occurs in light projection regions of adjacent image processing sensors, which causes so-called overexposure or interference fringes. As a result, disadvantageously, an article actually having a good quality may be falsely recognized as not having a good quality, or an article that should actually be eliminated due to its poor quality may be falsely recognized as having a good quality.

SUMMARY OF THE INVENTION

The present invention has been made in view of the above circumstances, and an object thereof is to provide an image processing sensor system capable of preventing interference caused by the projection of light between adjacent image processing sensors even when an imaging unit and a lighting unit are integrated with each other, an image processing sensor control method, and an image processing sensor used in the image processing sensor system.

In order to achieve the above object, according to one embodiment of the invention, an image processing sensor system includes: a plurality of image processing sensors each including an imaging device having an imaging unit imaging an inspection target and a lighting unit projecting light onto the inspection target, and an image processing device performing image processing on image data acquired in the imaging device and determining whether the inspection target is defective or non-defective, wherein the image processing sensors are connected to each other so that data communication of data including the image data can be performed therebetween, and wherein the plurality of image processing sensors includes a first image processing sensor and a second image processing sensor which is adjacently provided to the first image processing sensor, the first image processing sensor transmits a signal relating to the completion of projecting light to the second image processing sensor, and the second image processing sensor starts projecting light and imaging after receiving the signal relating the completion of projecting light.

Further, according to another embodiment of the invention, in the image processing sensor system according to the first aspect, the first image processing sensor transmits the signal relating to the completion of projecting light to the second image processing sensor after completing imaging and projection and before starting image processing in the image processing device.

Further, according to still another embodiment of the invention, in the image processing sensor system according to the first or second aspect, the first image processing sensor starts image processing of an image corresponding to the signal relating to the completion of projecting light after the second image processing sensor starts imaging and projection.

Further, according to still another embodiment of the invention, in the image processing sensor system according to any one of the first to third aspects, the first image processing sensor transmits the signal relating to the completion of projecting light to the second image processing sensor after completing imaging and projection and starting image processing, and the second image processing sensor starts imaging and projection after receiving the signal relating to the completion of projecting light.

Further, according to still another embodiment of the invention, in the image processing sensor system according to any one of the first to fourth aspects, a plurality of groups each including one or a plurality of image processing sensors are formed, the groups include at least a first group and a second group, an image processing sensor in the first group transmits the signal relating to the completion of projecting light to another image processing sensor in the first group, and an image processing sensor in the first group, the image processing sensor being connected to an image processing sensor of the second group, does not transmit the signal relating to the completion of projecting light to another image processing sensor, or an image processing sensor in the second group, the image processing sensor being connected to an image processing sensor in the first group, starts imaging and projection independently of the signal relating to the completion of projecting light transmitted from an image processing sensor connected to the image processing sensor in the first group.

Next, in order to achieve the above object, according to still another embodiment of the invention, an image processing sensor control method that can be performed in an image processing sensor system according to any one of the first to fourth aspects, includes: transmitting a signal relating the completion of projecting light from a first image processing sensor to a second image processing sensor; and starting imaging and projection in the second image processing sensor after receiving the signal relating the completion of projecting light.

Further, according to still another embodiment of the invention, in the image processing sensor control method according to the sixth aspect, the first image processing sensor transmits the signal relating to the completion of projecting light to the second image processing sensor after completing projection and before starting image processing in the image processing device.

Next, in order to achieve the above object, according to still another embodiment of the invention, an image processing sensor includes: an imaging device having an imaging unit imaging an inspection target and a lighting unit projecting light onto the inspection target, and an image processing device performing image processing on image data acquired in the imaging device and determining the quality of the inspection target, wherein the image processing sensor can transmit a signal relating to the completion of projecting light to an additional image processing sensor.

Further, according to still another embodiment of the invention, in the image processing sensor according to the eighth aspect, the image processing sensor can be connected between a first additional image processing sensor and a second additional processing sensor so that data communication can be performed with each of the first and second additional image processing sensors, the image processing sensor can transmit the signal relating to the completion of projecting light to the second additional image processing sensor; and the image processing sensor can receive the signal relating to the completion of projecting light from the first additional image processing sensor, and start imaging or projection on the basis of the received signal relating to the completion of projecting light.

In the first, sixth, and eighth aspects, the imaging device which has the imaging unit which images an inspection target and the lighting unit which projects light onto the inspection target, and the image processing device which performs image processing on image data acquired in the imaging device and determines the quality of the inspection target are provided. Therefore, the imaging device can be downsized. Further, even when a plurality of imaging devices are adjacently arranged, there is less restriction on the arrangement position thereof. Further, the first image processing sensor transmits a signal relating to the completion of projecting light to the second image processing sensor, and the second image processing sensor starts imaging and projection after receiving the signal relating the completion of projecting light. Therefore, even when the imaging processing sensors are adjacently arranged, interference caused by the projection of light does not occur, and the quality of an image to be picked up is not deteriorated.

In the second, seventh, and ninth aspects, the first image processing sensor transmits the signal relating to the completion of projecting light to the second image processing sensor after completing projection and before starting image processing in the image processing device. Therefore, even when the imaging processing sensors are adjacently arranged, interference caused by the projection of light does not occur, and the quality of an image to be picked up is not deteriorated.

In the third aspect, the first image processing sensor starts image processing of an image corresponding to the signal relating to the completion of projecting light after the second image processing sensor starts imaging and projection. Therefore, image processing involving a large arithmetic processing load can be independently performed. As a result, time required for determining the quality of an inspection target can be reduced as a whole.

In the fourth aspect, the first image processing sensor transmits the signal relating to the completion of projecting light to the second image processing sensor after completing imaging and projection and starting image processing, and the second image processing sensor starts imaging and projection after receiving the signal relating to the completion of projecting light. Therefore, it is possible to control timing of starting imaging and projection in the second image processing sensor at any timing after the start of the image processing using the signal relating to the completion of projecting light.

In the fifth aspect, a plurality of groups each including one or a plurality of image processing sensors are formed, the groups include at least a first group and a second group, an image processing sensor in the first group transmits the signal relating to the completion of projecting light to another image processing sensor in the first group, and an image processing sensor in the first group, the image processing sensor being connected to an image processing sensor of the second group, does not transmit the signal relating to the completion of projecting light to another image processing sensor. Therefore, by controlling timing of imaging and projection only for the image processing sensors in the first group, even when the image processing sensors are adjacently arranged, interference caused by the projection of light does not occur. Further, an image processing sensor in the second group, the image processing sensor being connected to an image processing sensor in the first group, starts imaging and projection independently of the signal relating to the completion of projecting light transmitted from an image processing sensor connected to the image processing sensor in the first group. Therefore, it is not necessary to allow the mutual interference prevention function to exhibit between the first group and the second group.

In the present invention, the imaging device can be downsized. Further, even when a plurality of imaging devices are adjacently arranged, there is less restriction on the arrangement position thereof. Further, the first image processing sensor transmits a signal relating to the completion of projecting light to the second image processing sensor, and the second image processing sensor starts imaging and projection after receiving the signal relating the completion of projecting light. Therefore, even when the imaging processing sensors are adjacently arranged, interference caused by the projection of light does not occur, and the quality of an image to be picked up is not deteriorated.

BRIEF DESCRIPTION OF THE DRAWINGS

FIGS. 2A and 2B are outside views illustrating the configuration of an imaging device of an image processing sensor according to the first embodiment of the present invention;

FIG. 12 is an exemplary diagram of a list of controllers displayed in an external computer of an image processing sensor system according to the second embodiment of the present invention;

FIG. 14 is an exemplary diagram of a list of controllers displayed in an external computer of an image processing sensor system according to the third embodiment of the present invention;

FIG. 19 is an exemplary diagram of a collective setting screen for turning on/off the mutual interference prevention function in the external computer or the display device of the image processing sensor system according to the fourth embodiment of the present invention;

DETAILED DESCRIPTION OF PREFERRED EMBODIMENTS

Hereinbelow, an image processing sensor system according to embodiments of the present invention will be described with reference to the drawings. Elements having the same or similar configurations or functions are denoted by the same or similar reference signs throughout the drawings referenced in the description of embodiments, and detailed description thereof will be omitted. Hereinbelow, a case where an image processing sensor which performs quality determination (including defective or non-defective, OK/NG judgment and pass/fail judgment) for an inspection target is used in the image processing sensor system will be described as an example.

(First Embodiment)

Figure 1:
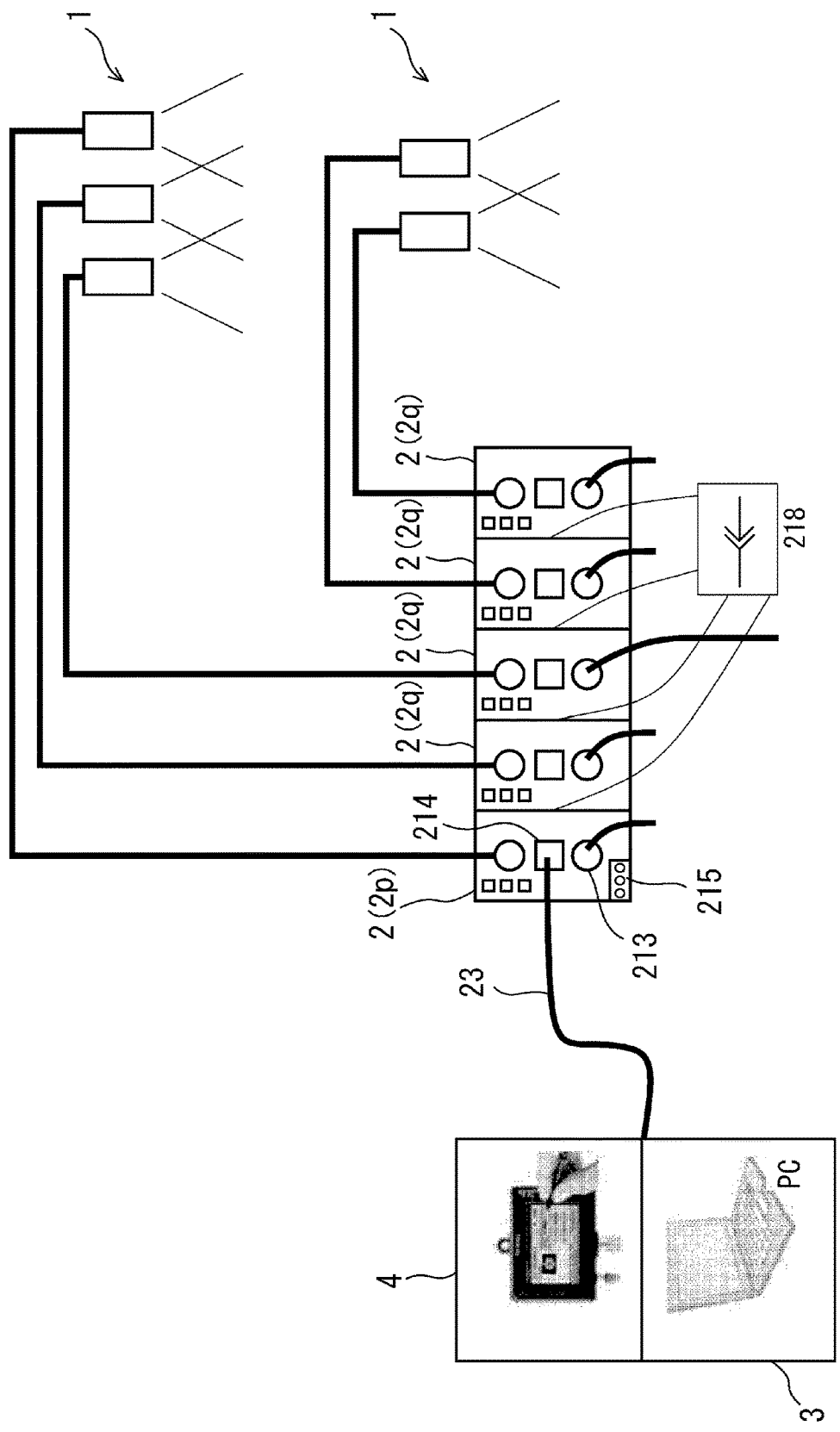
FIG. 1 is a schematic view illustrating the configuration of an image processing sensor system according to a first embodiment of the present invention.

FIG. 1 is a schematic view illustrating the configuration of an image processing sensor system according to the first embodiment of the present invention. As illustrated in FIG. 1, a plurality of image processing sensors are used in the image processing sensor system according to the first embodiment. Each of the image processing sensors includes an imaging device 1 and an image processing device (hereinbelow, referred to as a controller) 2 which is connected to the imaging device 1 through a connection cable so that data communication can be performed with the imaging device 1.

The imaging devices 1 are each provided with a camera module (imaging unit) and a lighting unit. The camera module has an imaging element for imaging an inspection target and the lighting unit projects light onto the inspection target. In order to downsize the imaging device 1, the controller 2 which performs image processing is provided separately from the imaging device 1. In the image processing, a part of the processing (preprocessing such as filter processing) may be performed in the imaging device 1 and image data after performing the preprocessing thereon may be transmitted to the controller 2 to perform the rest of the image processing by the controller 2. Alternatively, an image picked up in the imaging device 1 may be directly transmitted to the controller 2.

The controllers 2 which are connected to the respective imaging devices 1 through connection cables are each provided with a FPGA, DSP, or the like which performs image processing inside thereof, and controls operations of the imaging unit and the lighting unit of the imaging device 1 and performs image processing on an acquired image. In particular, the DSP performs color area detection processing, pattern retrieval processing, and the like on the image. Further, as a result of the image processing, an OK/NG signal (determination signal) which indicates the quality of an inspection target is outputted depending on whether the inspection target has been detected. Of course, such processing may be performed by the FPGA. The OK/NG signal is outputted from an I/O connector 213 provided in each of the controllers $2p$, $2q$ to an external PLC, another photoelectric sensor or proximity sensor, an indicator lamp or the like (hereinbelow, referred to as a PLC or the like) thorough an I/O cable. The I/O connector 213 is provided in each of the controllers 2 including not only a master unit $2p$, but also slave units $2q$.

The controllers 2 which are adjacently arranged are connected to each other so that data communication can be performed with each other. In the controllers 2 which are connected to each other, at least a first controller 2p serves as a master unit and is provided with an Ethernet connector 214 and a power terminal 215. The second controllers 2q as slave units are connected at least to the first controller 2p (master unit). Although four slave units 2q are connected to the master unit 2p in FIG. 1, the number of slave units to be connected to the master unit 2p is not limited thereto. For example, any number of slave units such as eight slave units and sixteen slave units can be connected to the master unit 2p.

The image processing sensors are connected to an external computer 3 or a display device 4 through the Ethernet connector 214 and an Ethernet cable 23 provided at least in the first controller (master unit) 2p, and data communication of image data is performed therebetween. The controllers 2 which are adjacently arranged perform data communication with each other.

Examples of data to be communicated include image data of an image picked up by each of the imaging devices 1 connected to corresponding one of the controllers 2 (including image data after performing image processing thereon), setting data of setting received in the external computer 3 or the display device 4, and a mutual interference prevention trigger signal (described below).

A mutual interference prevention trigger signal and setting data of setting received from the external computer 3 or the display device 4 are transmitted from the master unit 2p to the slave unit 2q. A mutual interference prevention trigger signal and setting data of setting received from the external computer 3 or the display device 4 through the master unit 2p are transmitted from a slave unit 2q located close to the master unit 2p to a slave unit 2q located at distance from the master unit 2p.

Further, from a slave unit 2q located close to the master unit 2p to the master unit 2p, image data acquired in the close slave unit 2q, image data acquired in a slave unit 2q located at distance from the master unit 2p than the close slave unit 2q, and other control signals are transmitted. Further, from a slave unit 2q located at distance from the master unit 2p to a slave unit 2p located closer to the master unit 2p, image data acquired in the distant slave unit 2q, image data acquired in a slave unit 2q located at more distance from the master unit 2p than the distant slave unit 2q, and other control signals are transmitted.

The external computer 3 and the display device 4 can transmit setting data to the controller (master unit) 2p, transmit setting data also to the second controllers (slave units) 2q through the controller (master unit) 2p, and read out data including image data stored in the controllers 2.

The external computer 3 is used by installing a computer program for operating the image processing sensors in a commercially available personal computer or the like.

The display device 4 is smaller than the external computer 3. The display device 4 is provided with, for example, a touch panel display unit as a display unit, and has a display function and a communication function for communicating with the controllers 2.

Adjacent controllers 2 in FIG. 1 are connected in contact with each other through connector pins 218. In FIG. 1, a female pin (part of 218) is provided on the right side (on the sheet) of each of the controllers 2 and a male pin (part of 218) is provided on the left side (on the sheet) thereof. However, in FIG. 1, no male pin is provided on the left side (on the sheet) of the master unit 2p.

Further, although the master unit 2p is arranged on the left and the slave units 2q are arranged on the right side of the master unit 2p (on the sheet) in FIG. 1, the present invention is not particularly limited thereto. The slave units 2q may be arranged on the left side of the master unit 2p, or may also be arranged on both sides of the master unit 2p.

In FIG. 1, the Ethernet cable 23 is illustrated as if being connected to both the external computer 3 and the display device 4. However, data communication is performed with the controllers 2 using either one of the external computer 3 or the display device 4.

FIG. 1 illustrates five image processing sensors (the imaging devices 1 and the controllers 2). Imaging devices 1 of three image processing sensors from the left (on the sheet) are arranged close to each other, and form one group. Similarly, imaging devices 1 of two image processing sensors from the right are arranged close to each other, and form another group. In this manner, the imaging devices 1 of the image processing sensors can be divided into groups, and a mutual interference prevention function which will be described below in the fourth embodiment can be used. More specifically, in the group formed from the three image processing sensors, the imaging devices 1 are arranged close enough to each other to allow imaging regions or projection regions indicated by broken lines in FIG. 1 to overlap each other. Further, also in the group formed from the two image processing sensors, the imaging devices 1 are arranged close to each other in the same degree as above.

The imaging device 1 is smaller than an imaging device of a conventional image processing sensor, and can be arranged even in a small space. Therefore, even when the imaging devices 1 are arranged side by side so as to face the same direction, the imaging devices 1 can be arranged close enough to each other to allow the imaging regions or the projection regions to overlap each other.

Of course, the image processing sensors can also be used independently of each other to inspect different inspection targets without dividing the imaging processing sensors into groups as illustrated in FIG. 1. In this case, the imaging devices 1 are arranged at positions unrelated to each other. However, because the controllers 2 which are adjacently arranged are connected to each other, the controllers 2 are easily controlled in the external computer 3 or the display device 4.

As illustrated in FIG. 1, the imaging processing sensors each of which has the imaging device 1 and the controller 2 are connected to the external computer 3 or the display device 4 through the Ethernet cable 23 to configure the image processing sensor system.

FIGS. 2A and 2B are outside views illustrating the configuration of the imaging device 1 of the image processing sensor according to the first embodiment of the present invention. FIG. 2A is a front view illustrating the configuration of the imaging device 1 of the image processing sensor according to the first embodiment of the present invention. FIG. 2B is a schematic cross-sectional view illustrating the configuration of the imaging device 1 of the image processing sensor according to the first embodiment of the present invention.

As illustrated in FIG. 2A, the imaging device 1 includes, as an imaging unit 12, a lens 121 which is arranged near the center on the front face thereof and, as a lighting unit 11, a plurality of LEDs 111 (four LEDs 111 in FIG. 2A) which are arranged to surround the circumference of the lens 121. Further, a reflector 112 (not illustrated) is provided on the front side of each of the LEDs 111. During imaging, light is projected onto an inspection target by allowing the LEDs 111 to illuminate, thereby making it possible to clearly image the inspection target. The lighting unit 11 is not limited to the four LEDs 111 arranged around the imaging unit 12 (lens 121), and it is only necessary to provide one or more lighting tools as the lighting unit 11 inside the imaging device 1.

As illustrated in FIG. 2B, the imaging unit 12 of the imaging device 1 is provided with a CMOS board 122 on which an imaging element such as a CMOS image sensor and a CCD is mounted and a focus control unit 123 as a movable unit which can change a distance between the CMOS board 122 and the lens 121. The focus control unit 123 moves the CMOS board 122 back and forth in response to a signal from the controller 2 to thereby achieve an autofocus function.

Further, in the lighting unit 11, the reflector (light guide unit) 112 is arranged on the front side of each of the LEDs 111. Accordingly, light emitted from the LEDs 111 is formed into parallel beams as far as possible.

Figure 3:
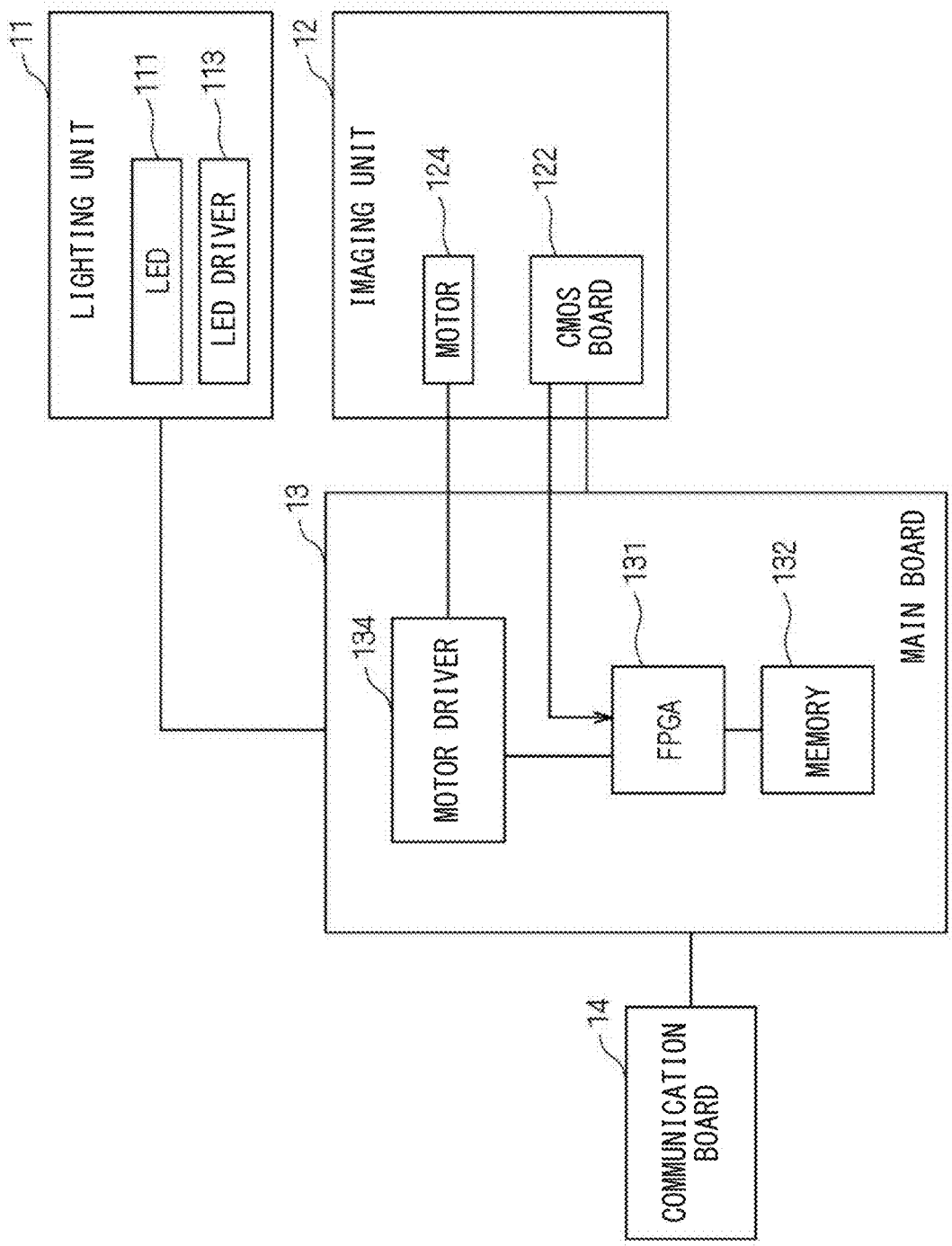
FIG. 3 is a block diagram illustrating the hardware configuration of the imaging device of the image processing sensor according to the first embodiment of the present invention.

FIG. 3 is a block diagram illustrating the hardware configuration of the imaging device 1 of the image processing sensor according to the first embodiment of the present invention. In FIG. 3, the imaging device 1 of the image processing sensor according to the first embodiment includes the imaging unit 12 and the lighting unit 11. A main board 13 controls operations of the imaging unit 12 and the lighting unit 11. A communication board 14 controls communication with the controller 2. For example, by driving a motor 124 of the imaging unit 12 in response to a control signal for controlling an autofocus operation from the main board 13, the focus control unit 123 illustrated in FIG. 2B moves back and forward to control the autofocus operation. Further, an inspection target is imaged in response to an imaging instruction signal from the main board 13.

In the first embodiment, the CMOS board 122 on which the imaging element is mounted is provided. A color image picked up by the CMOS board 122 is, for example, subjected to filter processing in a FPGA 131, and image data after performing image processing thereon is then outputted. That is, image conversion processing involving a large arithmetic processing load or the like is not performed in the imaging device 1. Therefore, a semiconductor device provided inside the imaging device 1 can be downsized. Further, because the necessity of arrangement with taking heat release into consideration is relatively reduced, the imaging device 1 can be downsized.

The main board 13 controls the operation of each of the units connected thereto. For example, a control signal for controlling on/off of the LEDs 111 is transmitted to an LED driver 113 of the lighting unit 11. The LED driver 113 regulates on/off, the amount of light, and the like of the LEDs 111 in response to the control signal from the FPGA 131. Further, a control signal for controlling an autofocus operation is transmitted to the motor 124 of the imaging unit 12 through a motor driver 134 of the main board 13, and an imaging instruction signal or the like is transmitted to the CMOS board 122 of the imaging unit 12.

The communication board 14 transmits image data about an inspection target outputted from the main board 13 to the controller 2. Further, the communication board 14 receives a control signal for the imaging device 1 from the controller 2, and transmits the received control signal to the main board 13.

Figure 4:
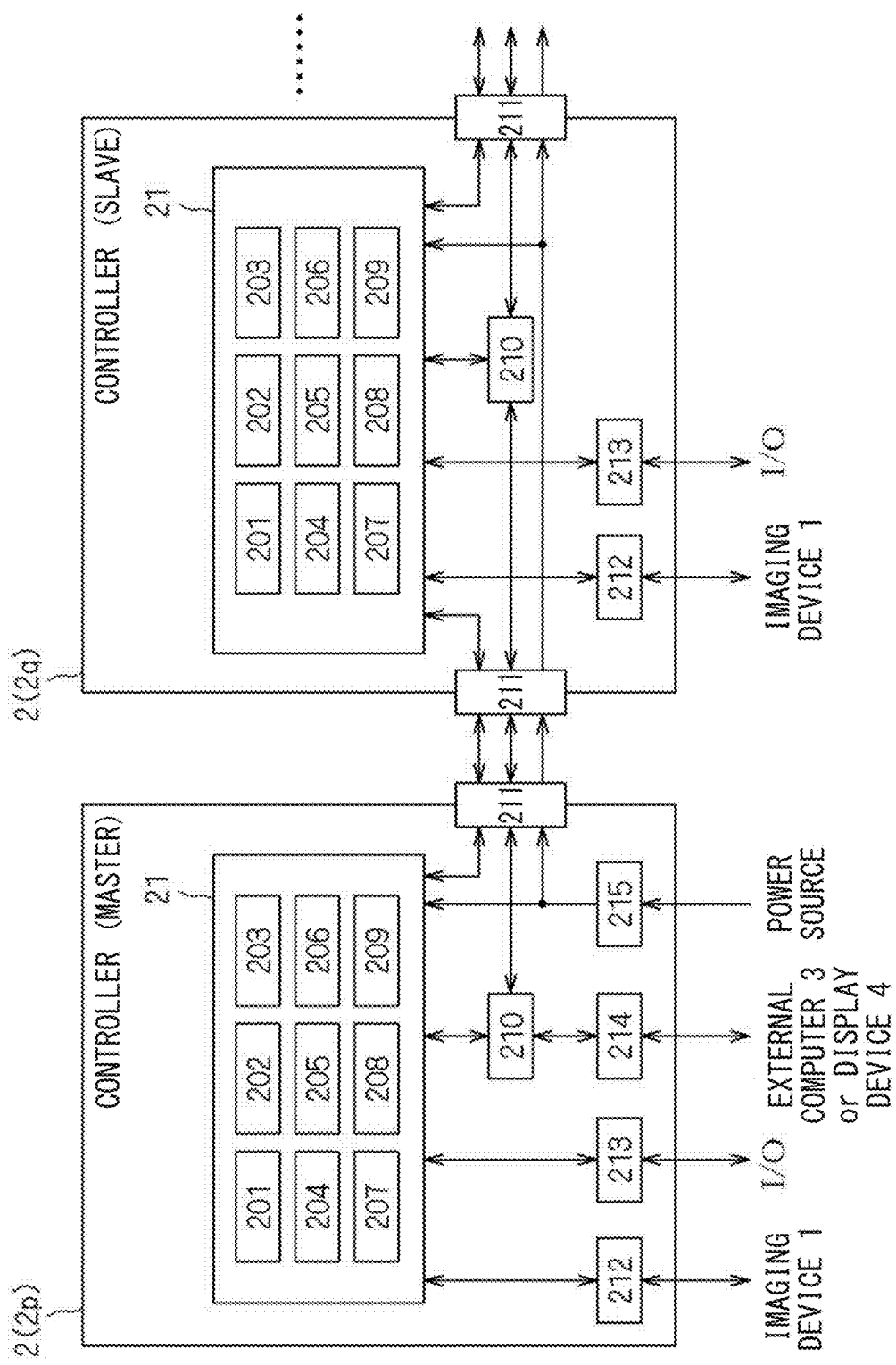
FIG. 4 is a block diagram illustrating the hardware configuration of a controller of the image processing sensor according to the first embodiment of the present invention.

FIG. 4 is a block diagram illustrating the hardware configuration of the controller 2 of the image processing sensor according to the first embodiment of the present invention. In FIG. 4, a first controller 2p which functions as a master unit and a second controller 2q which functions as a slave unit are adjacently connected to each other. Further, other second controllers 2q are continuously connected in series to the second controller 2q as the slave unit which is adjacently connected to the first controller 2p as the master unit. More specifically, a coupling connector 211 of the first controller 2p as the master unit and a coupling connector 211 of the second controller 2q as the slave unit are connected to each other. In the first embodiment, the first controller 2p as the master unit includes a main board 21 which includes a microcomputer, a FPGA, a DSP, a gate array or the like, and an Ethernet switch 210, the coupling connector 211, an imaging device connector 212, the I/O connector 213, the Ethernet connector 214, and the power terminal 215 which are all connected to the main board 21. Further, the second controller 2q as the slave unit includes a main board 21, and an Ethernet switch 210, the coupling connector 211, an imaging device connector 212, and the I/O connector 213 which are all connected to the main board 21. However, unlike the first controller 2p as the master unit, the Ethernet connector 214 and the power terminal 215 are not provided in the second controller 2q as the slave unit.

Further, the main board 21 is not limited to the configuration of the single body of a microcomputer, a FPGA, a DSP, a gate array or the like. For example, the main board 21 may be configured by combining a FPGA and a DSP or combining a DSP and a gate array, or providing a plurality of DSPs to perform parallel processing. The main board 21 is provided with, as functional blocks, a trigger control unit 201, an I/O control unit 202, a mutual interference control unit 203, an image processing unit 204, an image data storage unit 205, an image processing result storage unit 206, an Ethernet communication control unit 207, a setting storage unit 208, and an imaging device communication control unit 209. The trigger control unit 201 controls an imaging timing signal (trigger signal), and transmits the signal to the imaging device 1.

The I/O control unit 202 performs data communication of an I/O signal with an external input/output device (not illustrated). The imaging timing signal is transmitted to the imaging device 1 when the imaging timing signal is received in the I/O connector 213 from the PLC, reception of the imaging timing signal from the external computer 3 or the display device 4 is detected, or the imaging timing signal is issued from a built-in timer.

The mutual interference control unit 203 is used for controlling, in order to prevent the interference between imaging devices 1 of a plurality of image processing sensors, on/off of lighting and imaging timing in one imaging device 1 and on/off of lighting and imaging timing of another imaging device 1. Details thereof will be described in the fourth embodiment.

The image processing unit 204 performs image processing on image data that is picked up by the imaging device 1 and received therein. For example, the image processing unit 204 performs color area detection processing, pattern retrieval processing, and the like on the image data. An OK/NG signal (determination signal) which indicates the quality of an inspection target depending on whether the inspection target has been detected is outputted as a result of the image processing to an external output device (not illustrated) such as the PLC through the I/O connector 213 by the I/O control unit 202.

The image data storage unit 205 stores therein image data. In the image data storage unit 205, both an image that is currently being picked up by the imaging device 1 and image data picked up in the past are stored. The image processing result storage unit 206 stores therein image-processed image data and a result of processing such as pattern retrieval processing.

The Ethernet communication control unit 207 controls Ethernet communication, and performs output of image data stored in the image data storage unit 205 to the external computer 3 or the display device 4, transmission/reception of setting data, and the like. In the first controller 2p as the master unit, the Ethernet communication control unit 207 controls communication with the external computer 3 or the display device 4. On the other hand, in the second controller 2q as the slave unit, the Ethernet communication control unit 207 controls communication with the external computer 3 or the display device 4 through the Ethernet switch 210 of the first controller 2p as the master unit. The setting storage unit 208 stores therein setting data such as an IP address, a MAC address, and setting data of a mutual interference prevention function.

The imaging device communication control unit 209 controls communication between the controller 2 and the imaging device 1, receives image data from the imaging device 1 and transmits setting data about an imaging condition to the imaging device 1.

The Ethernet switch 210 is an Ethernet communication hub. The Ethernet switch 210 of the first controller 2p as the master unit ensures a path for data communication with a second controller 2q that is adjacently connected thereto. The Ethernet switch 210 of a second controller 2q as the slave unit ensures paths (signal lines) for data communication with controllers 2 (2p or 2q) that are adjacently connected thereto on both sides thereof. The Ethernet switch 210 of the first controller 2p as the master unit is connected to the Ethernet connector 214, and connected to the external computer 3 or the display device 4 through the Ethernet cable 23 illustrated in FIG. 1.

(1) Method for Transmitting Setting Data

When transmitting setting data from the external computer 3 or the display device 4 to the controller 2, the setting data is transmitted to the Ethernet switch 210 of the first controller 2p as the master unit through the Ethernet connector 214 of the first controller 2p as the master unit. The external computer 3 or the display device 4 previously specifies using an IP address or the like to which one of the controllers 2 of the respective image processing sensors setting data is transmitted. When the Ethernet switch 210 determines that a transmission destination of the setting data is not its own device and when the Ethernet switch 210 determines that the transmission destination of the setting data is its own device, the Ethernet switch 210 transmits (transfers) the setting data to a next controller 2 that is adjacently connected thereto. The setting data is inputted to the main board 21 through the Ethernet switch 210 of the controller 2 specified by the external computer 3 or the display device 4.

(2) Method of Transmitting Image Data to External Computer 3 or Display Device 4

The coupling connectors 211 couple adjacent controllers 2 to each other, and function as a transmission/reception path for, for example, a control signal such as a mutual interference trigger signal, image data, and the like. The external computer 3 or the display device 4 selects a controller 2 from which image data is to be read out from the controllers 2 of the respective image processing sensors. When the slave unit 2q located immediately next to the master unit 2p is selected, a signal for reading out the image data is inputted to the main board 21 of the selected slave unit 2q through the Ethernet cable 23, the Ethernet connector 214, the Ethernet switch 210 and the coupling connector 211 of the master unit 2p, and the coupling connector 211 and the Ethernet switch 210 of the selected slave unit 2q. The image data is read out from the image data storage unit 205 of the selected slave unit 2q to the external computer 3 or the display device 4 through the Ethernet switch 210 and the coupling connector 211 of the selected slave unit 2q, and the coupling connector 211 and the Ethernet switch 210 of the master unit 2p. The signal for reading out image data and the image data are not inputted to the main board 21 in the master unit 2p, but transferred to the slave unit 2q through the Ethernet switch 210.

In FIG. 4, a control signal such as a mutual interference trigger signal is transmitted from the main board 21 of the first controller 2p as the master unit to the main board 21 of the second controller 2q as the slave unit that is adjacently connected thereto through the coupling connectors 211. Also, power is supplied from the power terminal 215 of the first controller 2p as the master unit to the main board 21 thereof, and supplied to the second controller 2q as the slave unit that is adjacently connected thereto through the coupling connectors 211. In the same manner, power is supplied to all of the second controllers 2q as the slave units connected in series.

The imaging device connector 212 of each of the controllers 2 is connected to the corresponding imaging device 1, and transmits setting data, an autofocus control signal and the like and receives image data and the like. The I/O connector 213 transmits/receives an I/O signal to/from an external input/output device (not illustrated).

The Ethernet connector 214 is provided at least in the master unit 2p. The Ethernet connector 214 is connected to the Ethernet switch 210 and also used in data communication between the slave units 2q and the external computer 3 or the display device 4. The power terminal 215 is provided only in the master unit 2p. Power is supplied from the master unit 2p to the slave units 2q through the coupling connectors 211. With such a configuration, even when using a plurality of image processing sensors, wiring of the Ethernet cable 23, a power cable and the like can be simplified, and replacement and exchange of the image processing sensors can be easily performed.

That is, by providing the Ethernet connector 214 and the power terminals 215 at least only in the master unit 2p, complicated wiring of cables can be eliminated.

In the controllers illustrated in FIG. 4, one difference between the first controller 2p as the master unit and the second controller 2q as the slave unit is that the Ethernet connector 214 is provided in the first controller 2p as the master unit, but not provided in the second controller 2q as the slave unit.

In the first embodiment, "the Ethernet connector 214 is not provided" indicates not only a case where no Ethernet connector 214 is physically provided, but also a case where, although the Ethernet connector 214 is provided, the provided Ethernet connector 214 does not function as a communication interface of Ethernet communication such as when the Ethernet connector 214 is not connected to the Ethernet switch 210 and when the Ethernet connector 214 is not connected to an internal signal line.

Figure 5A:
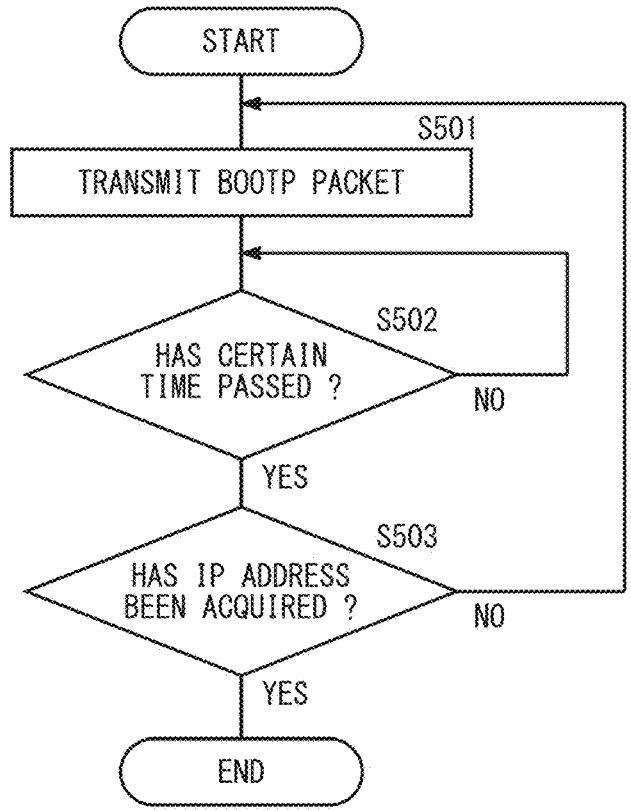
FIGS. 5A and 5B are flow charts illustrating the procedure of Ethernet connection processing in the controller of the image processing sensor according to the first embodiment of the present invention between a second controller and an external computer or a display device ("Ethernet" is a registered trade mark, and the same applies hereinafter)
Figure 5B:
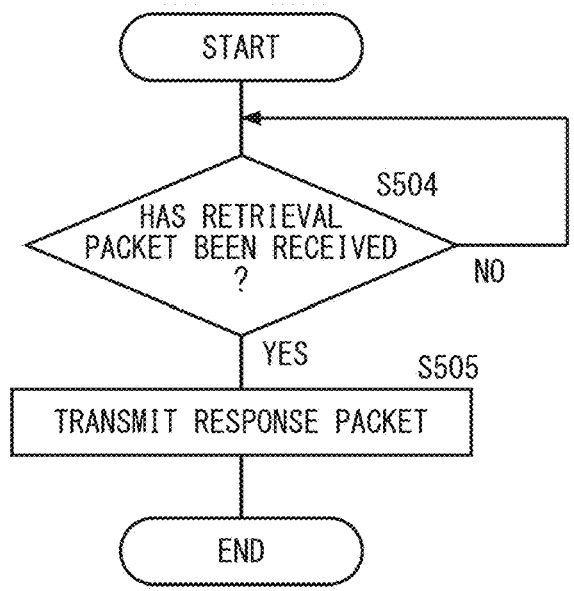

FIGS. 5A and 5B are flow charts illustrating the procedure of Ethernet connection processing in the controller 2 of the image processing sensor according to the first embodiment of the present invention between the second controller (slave unit) 2 and the external computer 3 or the display device 4. FIG. 5A illustrates the procedure of processing when an IP address is not assigned to the controller 2. FIG. 5B illustrates the procedure of processing when an IP address is assigned to the controller 2.

In FIG. 5A, the controller 2 first transmits a BOOTP packet to an external BOOTP server (step S501). Then, the controller 2 determines whether a certain time has passed after the transmission of the BOOTP packet (step S502). When the controller 2 determines that the certain time has not yet passed (NO in step S502), the controller 2 enters a passage waiting state.

When the controller 2 determines that the certain time has passed (YES in step S502), the controller 2 determines whether an active IP address has been acquired (step S503). When the controller 2 determines that the IP address has not been acquired (NO in step S503), the controller 2 returns the processing to step S501, and repeats the above processing. When the controller 2 determines that the IP address has been acquired (YES in step S503), the controller 2 finishes the processing.

Next, in FIG. 5B, the controller 2 determines whether a retrieval packet has been received (step S504). When the controller 2 determines that the retrieval packet has not yet been received (NO in step S504), the controller 2 enters a reception waiting state. When the controller 2 determines that the retrieval packet has been received (YES in step S504), the controller 2 transmits a response packet (step S505).

Figure 6:
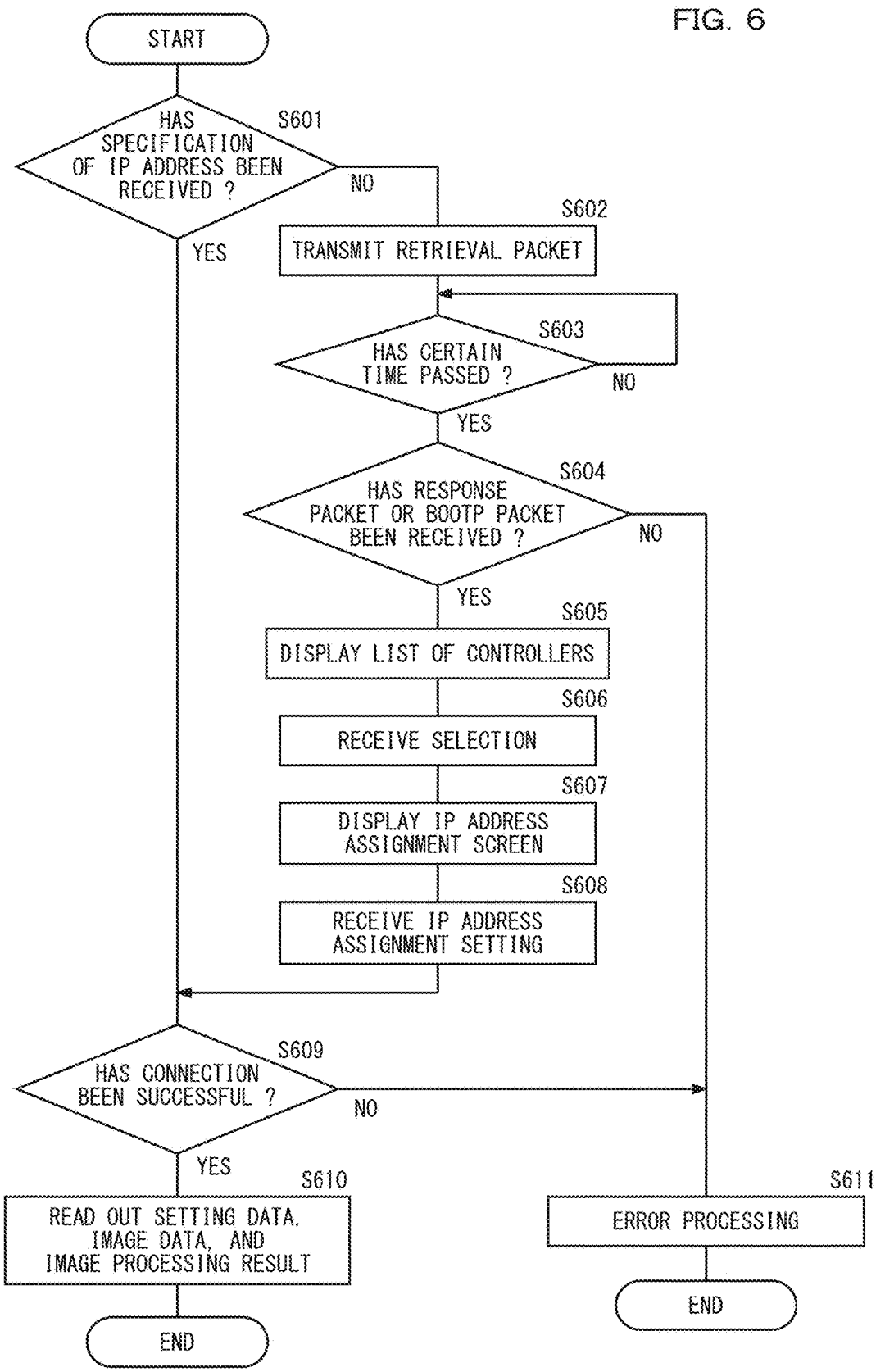
FIG. 6 is a flow chart illustrating Ethernet connection processing with the controller, in the external computer of the image processing sensor system according to the first embodiment of the present invention.

FIG. 6 is a flow chart illustrating the Ethernet connection processing with the controller 2, in the external computer 3 of the image processing sensor system according of the first embodiment of the present invention. The processing procedure itself is the same as below also when the display device 4 is used instead of the external computer 3.

In FIG. 6, the external computer 3 determines whether specification of an IP address of a connection target controller 2 has been received (step S601). When the external computer 3 determines that the specification has not been received (NO in step S601), the external computer 3 transmits a retrieval packet to the controller 2 (step S602).

Then, the external computer 3 determines whether a certain time has passed after the transmission of the retrieval packet (step S603). When the external computer 3 determines that the certain time has not yet passed (NO in step S603), the external computer 3 enters a passage waiting state. When the external computer 3 determines that the certain time has passed (YES in step S603), the external computer 3 determines whether a response packet or a BOOTP packet has been received from the controller 2 in response to the retrieval packet (step S604).

When the external computer 3 determines that the response packet or the BOOTP packet has not been received (NO in step S604), the external computer 3 determines that there is no connection target controller 2 within a network and performs error processing (step S611), and finishes the processing. When the external computer 3 determines that the response packet or the BOOTP packet has been received (YES in step S604), the external computer 3 displays a list of connection target controllers 2 (step S605).

Figure 7:
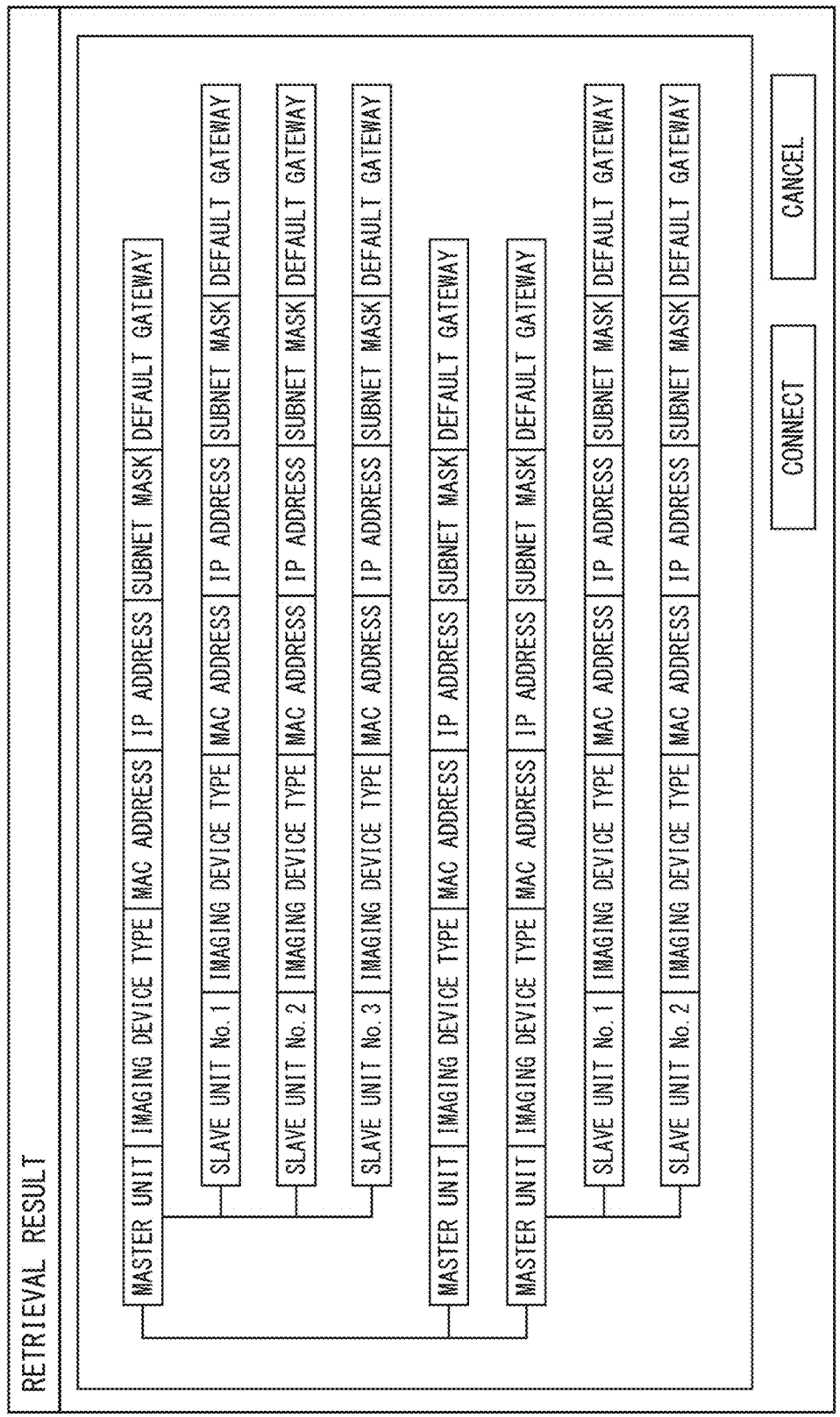
FIG. 7 is an exemplary diagram of a list of controllers displayed in the external computer of the image processing sensor system according to the first embodiment of the present invention.

FIG. 7 is an exemplary diagram of a list of controllers 2 displayed in the external computer 3 of the image processing sensor system according to the first embodiment of the present invention. In the example of FIG. 7, controllers 2 each provided with the Ethernet connector 214 and the power terminal 215 are defined as master units 2p, and the other controllers 2 are defined as slave units 2q. The type of an imaging device 1, a MAC address, an IP address, a subnet mask, and a default gateway are displayed for each of the master units 2p and each of the slave units 2q. These pieces of information may be included in response packets, BOOTP packets and the like of the master unit 2p and the slave units 2q as information, or may also be included in a response packet, a BOOTP packet and the like of the master unit 2p as information. Further, a dedicated serial communication line may be separately added between the master unit 2p and the slave units 2q to thereby gather information of the slave units 2q in the master unit 2p.

In FIG. 7, three master units 2p are connected to the external computer 3 of the image processing sensor system according to the first embodiment on the same network. More specifically, FIG. 7 illustrates an example in which a master unit 2p to which three slave units 2q are connected, a master unit 2p to which no slave unit 2q is connected, and a master unit 2p to which two slave units 2q are connected are connected to the external computer 3. In this manner, a single external computer 3 can be connected not only to a combination of a master unit 2p and a slave unit 2q, but also to a plurality of combinations of master units 2p and slave units 2q.

In the example of a display screen illustrated in FIG. 7, a master unit 2p and slave units 2q connected to the master unit 2p are illustrated in a tree-like form. Therefore, it is possible to easily confirm to which master unit 2p a slave unit 2q is connected, or confirm an IP address of a slave unit 2q of any order from one master unit 2p. When a plurality of slave units 2q are connected to a single master unit 2p and maintenance is intended to be performed or visual confirmation in the external computer 3 connected thereto is intended to be performed for one of the slave units 2q, individual identification information such as an IP address and a physical positional relationship with the master unit 2p (which position the target controller 2 is located from the master unit 2p) can be easily confirmed. Only a single Ethernet connector 214 is provided in the master unit 2p. However, for example, by placing a commercially available Ethernet hub between the external computer 3 and a master unit 2p, data communication can be performed between the single external computer 3 and a plurality of master units 2p.

Referring back to FIG. 6, the external computer 3 receives the selection of a connection target controller 2 from the list of the controllers 2 by a user (step S606). The external computer 3 displays an IP address assignment screen for explicitly assigning an IP address (step S607), and receives IP address assignment setting by a user (step S608).

When the external computer 3 determines that specification of the IP address of the connection target controller 2 has been received (YES in step S601), the external computer 3 determines whether the connection has been successful (step S609). In this specification, "the connection has been successful" means that the connection target controller 2 has been logically connected, and TCP connection has been established. Further, step S607 and step S608 are performed only for a controller 2 to which IP address has not been assigned.

When the external computer 3 determines that the connection has been failed (NO in step S609), the external computer 3 performs error processing (step S611), and finishes the processing. When the external computer 3 determines that the connection has been successful (YES in step S609), the external computer 3 reads out setting data, image data, a result of image processing and the like from the connected controller 2 (step S610), and finishes the processing.

The external computer 3 and the controller 2 are connected to each other in this manner. The external computer 3 can transmit setting data to the connected controller 2, or the external computer 3 can display image data stored in the controller 2. Similarly, the external computer 3 can be connected not only to the first controller 2p as the master unit, but also to the second controller 2q as the slave unit.

Figure 8:
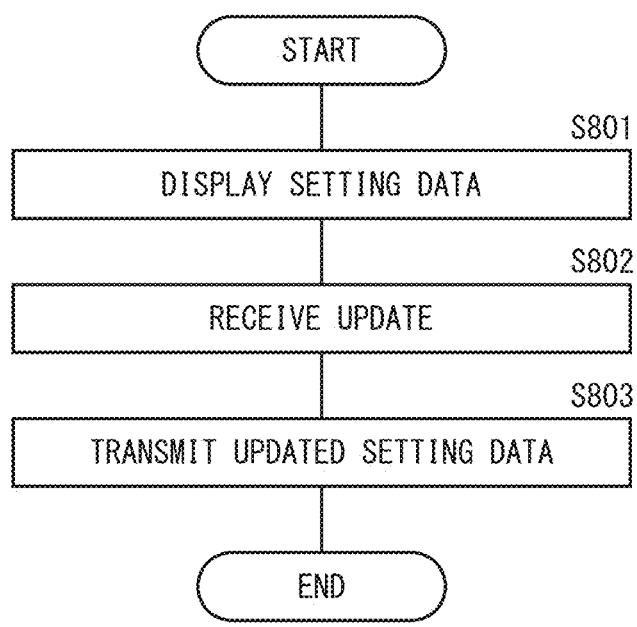
FIG. 8 is a flow chart illustrating the procedure of processing for updating setting data in the external computer of the image processing sensor system according to the first embodiment of the present invention.

FIG. 8 is a flow chart illustrating the procedure of setting data update processing in the external computer 3 of the image processing sensor system according to the first embodiment of the present invention. The processing procedure itself is the same as below also when the display device 4 is used instead of the external computer 3.

In FIG. 8, the external computer 3 displays setting data read out from the connected controller 2 (step S801). The external computer 3 receives update of the setting data by a user (step S802), and transmits the updated setting data to a controller 2 (step S803). The controller 2 to which the updated setting data is transmitted is either one of the first controller 2p as the master unit or the second controller 2q as the slave unit which has been connected to the external computer 3 in the procedure illustrated in FIG. 6.

Figure 9:
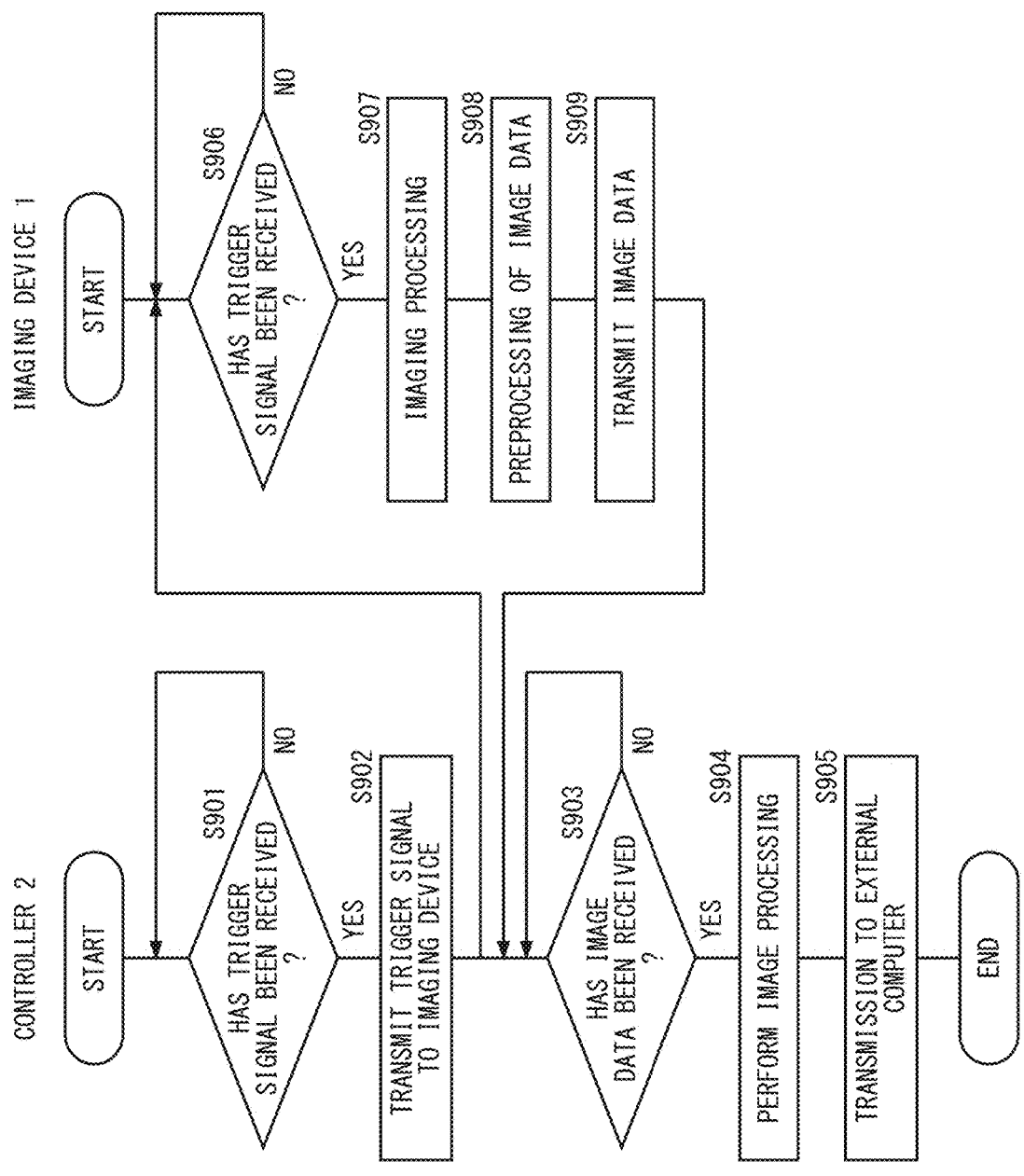
FIG. 9 is a flow chart illustrating the procedure of processing for transmitting image data from the image processing sensor to the external computer or the display device in the image processing sensor system according to the first embodiment of the present invention.

FIG. 9 is a flow chart illustrating the procedure of processing for transmitting image data from the image processing sensor to the external computer 3 or the display device 4 in the image processing sensor system according to the first embodiment of the present invention. The left flow in FIG. 9 indicates the procedure of image data transmission processing in the controller 2 of the image processing sensor. The right flow in FIG. 9 indicates the procedure of image data acquisition processing in the imaging device 1. The processing procedure itself is the same as below also when the display device 4 is used instead of the external computer 3.

In FIG. 9, the controller 2 determines whether an imaging timing signal (trigger signal) for starting imaging has been received (step S901). When the controller 2 determines that the imaging timing signal (trigger signal) has not been received (NO in step S901), the controller 2 enters a reception waiting state. The imaging timing signal (trigger signal) may be received from the I/O connector 213, or may also be received from a second controller 2q as the slave unit that is located near a first controller 2p as the master unit.

When the controller 2 determines that the imaging timing signal (trigger signal) has been received (YES in step S901), the controller 2 transmits the imaging timing signal (trigger signal) to the imaging device 1 (step S902).

The imaging device 1 determines whether the imaging timing signal (trigger signal) for staring imaging has been received (step S906). When the imaging device 1 determines that the imaging timing signal (trigger signal) has not been received (NO in step S906), the imaging device 1 enters a reception waiting state.

When the imaging device 1 determines that the imaging timing signal (trigger signal) has been received (YES in step S906), the imaging device 1 performs imaging processing for an inspection target under a set imaging condition (step S907), and performs preprocessing such as filter processing on image data obtained by the imaging (step S908). The imaging device 1 transmits the preprocessed image data to the controller 2 (step S909).

The controller 2 determines whether the image data has been received from the imaging device 1 (step S903). When the controller 2 determines that the image data has not been received (NO in step S903), the controller 2 enters an image data reception waiting state.

When the controller 2 determines that the image data has been received (YES in step S903), the controller 2 performs image processing on the received image data (step S904), and transmits the image-processed image data to the external computer 3 (step S905).

The timing of transmitting the image data to the external computer 3 may be while image processing is being performed on image data that differs from the image data to be transmitted. That is, the image data may be transmitted to the external computer 3 while color area detection processing, pattern retrieval processing or the like is being performed on another image data, or before transmitting an imaging timing signal (trigger signal) for picking up a next image to the imaging device 1.

Further, it is possible to receive the selection of a controller 2 and image data of the selected controller 2 from a plurality of controllers 2 by a GUI operation performed on the display screen of the external computer 3 or the display device 4. For example, it is possible to receive the selection from a plurality of possible controllers 2, and issue a request for displaying data of the newest image picked up by an imaging device 1 that is connected to the selected controller 2 and a result of determination regarding presence/absence of defect (defective or non-defective) in the image data. The selection from the external computer 3 or the display device 4 can be received independently of imaging processing and image processing of the controller 2 and the imaging device 1, and can be independently transmitted to the first controller 2p as the master unit.

The same is true when a plurality of controllers 2 are connected in series. For example, when three controllers 2, specifically, a master unit (controller) 2p, a slave unit (controller) 2q (1), and a slave unit (controller) 2q (2) are connected in series, upon receiving the selection of the slave unit 2q (2) from the display screen of the external computer 3 or the display device 4, a signal for reading out image data is transmitted to the slave unit 2q (2) through the master unit 2p and the slave unit 2q (1). The Ethernet communication control unit 207 of the main board 21 of the slave unit 2q (2) establishes communication with the external computer 3 or the display device 4 to transmit image data stored in the image data storage unit 205 to the external computer 3 or the display device 4 through Ethernet switch 210, and through the slave unit 2q (1) and the master unit 2p.

At this time, the signal for reading out image data is inputted to the Ethernet switch 210 of the master unit 2p from the Ethernet connector 214 of the master unit 2p. However, image data of the master unit 2p is not to be read out. Therefore, the Ethernet switch 210 of the master unit 2p is not data-communicated with the main board 21 of the master unit 2p, and the signal for reading out image data is inputted to the Ethernet switch 210 of the slave unit 2q (1) through the coupling connector 211 of the master unit 2p and the coupling connector 211 of the slave unit 2q (1).

As with the master unit 2p, image data of the slave unit 2q (1) is not to be read out. Therefore, the Ethernet switch 210 of the slave unit 2q (1) is not data-communicated with the main board 21 of the slave unit 2q (1), and the signal for reading out image data is inputted from the slave unit 2q (1) to the Ethernet switch 210 of the slave unit 2q (2) through a coupling connector 211 of the slave unit 2q (1), the coupling connector 211 being located opposite to the master unit 2p, and through the coupling connector 211 of the slave unit 2q (2). The Ethernet switch 210 of the slave unit 2q (2) determines that image data of the slave unit 2q (2) should be read out, and transmits the signal for reading out image data from the external computer 3 to the main board 21 of the slave unit 2q (2). The image data stored in the image data storage unit 205 in the main board 21 of the slave unit 2q (2) is transmitted to the external computer 3 through the same route.

Specifically, the image data is transmitted to the external computer 3 through the Ethernet switch 210 and the coupling connector 211 of the slave unit 2q (2), the coupling connector 211 located opposite to the master unit 2p, the Ethernet switch 210 and a coupling connector 211 located facing the master unit 2p of the slave unit 2q (1), and the coupling connector 211, the Ethernet switch 210 and the Ethernet connector 214 of the master unit 2p. At this time, the image data is not transmitted to the main boards 21 of the controllers 2 other than the connected slave unit 2q (2).

Of course, it is possible to issue a request for displaying not only the newest image data, but also past image data stored in the image data storage unit 205 and a result of determination regarding presence/absence of defect in the image data.

As described above, in the first embodiment, the imaging device 1 which has the imaging unit 12 for imaging an inspection target and the lighting unit 11 for projecting light onto the inspection target is separately provided from the controller 2 which performs image processing on image data acquired in the imaging unit 12 of the imaging device 1 and determines the quality of the inspection target. Therefore, the imaging device 1 itself can be downsized. Further, even when imaging devices 1 are arranged adjacent to each other, the imaging devices 1 can be arranged in a small space near an inspection target. Therefore, there is less restriction on the arrangement position of the imaging devices 1. Further, the Ethernet connector (communication interface) 214 which can perform data communication with the external computer 3 or the display device 4 is provided at least only in the master unit 2p among the controllers 2, and the slave unit 2q performs data communication with the external computer 3 or the display device 4 through the Ethernet connector (communication interface) 214 provided at least in the master unit 2p. Therefore, the slave unit 2q can independently perform data communication with the external computer 3 or the display device 4 without increasing the arithmetic processing load of the master unit 2p. Further, cables which are connected to the Ethernet connector (communication interface) 214 used in data communication with the external computer 3 or the display device 4, for example, the Ethernet cable 23 is provided at least only in the master unit 2p. Therefore, even when using a plurality of image processing sensors, wiring of the cables will never be complicated. Image data acquired in the imaging devices 1 of the connected image processing sensors can be transmitted to the external computer 3 or the display device 4 through the Ethernet cable 23.

Figure 10:
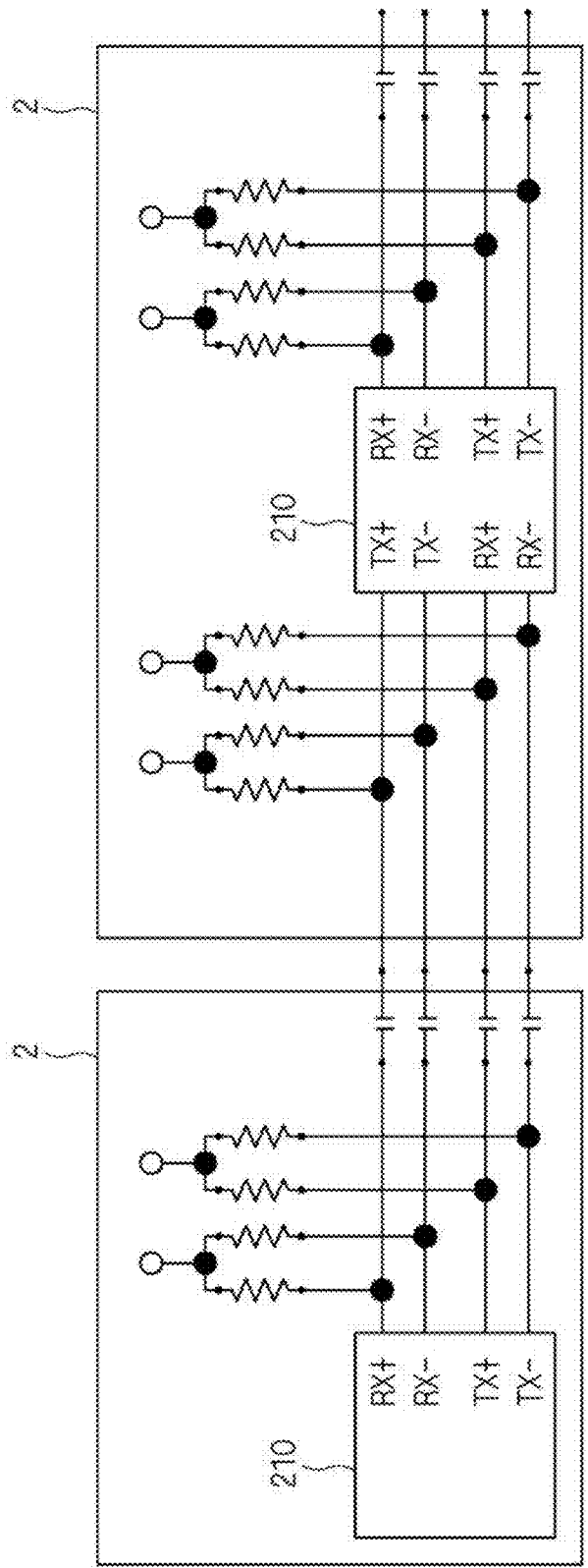
FIG. 10 is a schematic circuit diagram illustrating a connection state between Ethernet switches of controllers of the image processing sensors according to the first embodiment of the present invention.

FIG. 10 is a schematic circuit diagram illustrating a connection state between the Ethernet switches 210 of the controllers 2 of the image processing sensors according to the first embodiment of the present invention. As illustrated in FIG. 10, in the first embodiment, the Ethernet switches 210 of adjacent controllers 2 are connected to each other through signal lines, and a pulse transformer which is an insulation element is not required. Therefore, no pulse transformer is connected between the Ethernet switches 210. Thus, the number of components can be reduced, and the manufacturing cost can therefore be reduced. In addition, the controllers 2 can be downsized depending on the arrangement. A pulse transformer can achieve a noise resistance improving effect when performing data communication with the external computer 3 or the display device 4. However, because the Ethernet switch 210 of the first embodiment is used only for internal data communication, it is not necessary to take the trouble to provide a pulse transformer. Therefore, the manufacturing cost can be reduced by a cost relating to the provision of a pulse transformer.

(Second Embodiment)

The configuration of an image processing sensor according to the second embodiment of the present invention is the same as that of the first embodiment. Therefore, elements having the same or similar functions will be denoted by the same reference signs, and detailed description thereof will be omitted. The second embodiment differs from the first embodiment in that results of processing in controllers 2 are correctively stored in a master unit (first controller) 2p.

Figure 11:
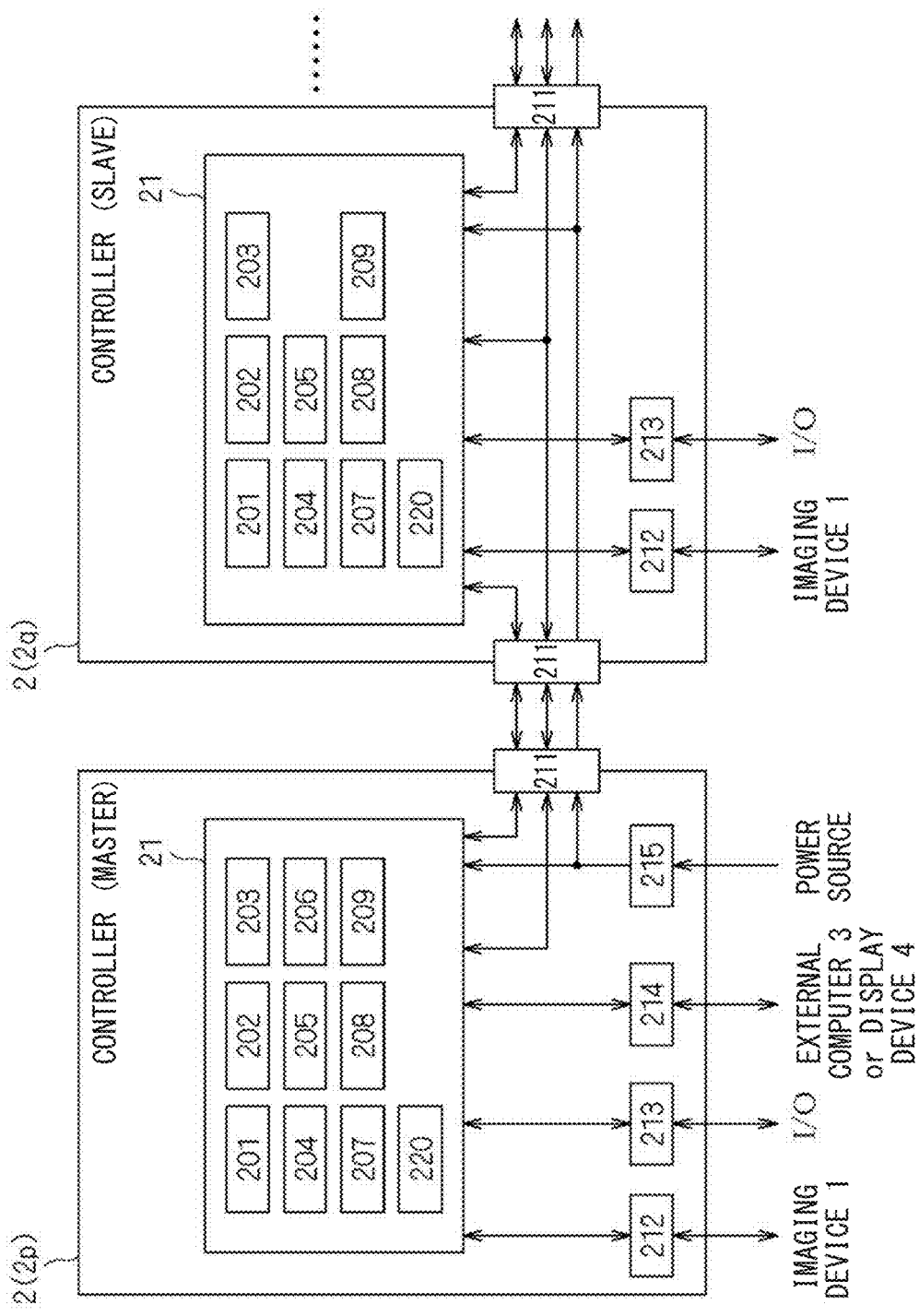
FIG. 11 is a block diagram illustrating the hardware configuration of a controller of an image processing sensor according to a second embodiment of the present invention.

FIG. 11 is a block diagram illustrating the hardware configuration of the controller 2 of the image processing sensor according to the second embodiment of the present invention. FIG. 11 illustrates a configuration in which a first controller 2p which functions as a master unit and a second controller 2q which functions as a slave unit are adjacently connected to each other, and second controllers 2q are further continuously connected in series thereto. In the second embodiment, the first controller 2p as the master unit includes a main board 21 which includes a microcomputer, a FPGA, a DSP, a gate array or the like, and a coupling connector 211, an imaging device connector 212, an I/O connector 213, an Ethernet connector 214 and a power terminal 215 which are all connected to the main board 21. Further, the second controller 2q as the slave unit includes a main board 21, and a coupling connector 211, an imaging device connector 212 and an I/O connector 213 which are all connected to the main board 21. However, unlike the first controller 2p as the master unit, the Ethernet connector 214 and the power terminal 215 are not provided in the second controller 2q as the slave unit. That is, the Ethernet connector 214 is provide only in the master unit 2p which is provided with an image processing result storage unit 206 which collectively stores therein the results of imaging processing. Further, the second controller 2q as the slave unit in the second embodiment differs from the second controller 2q as the slave unit in the first embodiment in that the second controller 2q of the second embodiment is not provided with the image processing result storage unit 206, but provided with an inter-device communication control unit 220.

Further, the main board 21 is not limited to the configuration of the single body of a microcomputer, a FPGA, a DSP, a gate array or the like. For example, the main board 21 may be configured by combining a FPGA and a DSP or combining a DSP and a gate array, or providing a plurality of DSPs to perform parallel processing. The main board 21 is provided with, as functional blocks, a trigger control unit 201, an I/O control unit 202, a mutual interference control unit 203, an image processing unit 204, an image data storage unit 205, the image processing result storage unit 206, an Ethernet communication control unit 207, a setting storage unit 208, an imaging device communication control unit 209, and the inter-device communication control unit 220.

The image processing result storage unit 206 which is provided at least in the master unit 2p collectively stores therein image data on which image processing is performed in the slave units 2q and results of processing such as pattern retrieval processing. Further, transmission/reception of image data and processing results between controllers 2 (between a master unit and a master unit, or between a slave unit and a slave unit) is performed through the inter-device communication control units 220.

The Ethernet communication control unit 207 controls Ethernet communication, and performs output of image data stored in the image data storage unit 205 or processing results stored in the image processing result storage unit 206 to the external computer 3 or the display device 4, transmission/reception of setting data, and the like. The setting storage unit 208 stores therein setting data such as an IP address, a MAC address, and setting data of a mutual interference prevention function.

In the second embodiment, the Ethernet switch 210 is not provided because it is sufficient to transmit processing results collectively stored at least in the master unit 2p to the external computer 3 or the display device 4.

Therefore, the coupling connectors 211 couple adjacent controllers 2 to each other, and also function as a transmission/reception path for, for example, results of image processing performed in the slave units 2q in addition to a control signal such as a mutual interference trigger signal, image data, and the like. Further, power is also supplied from the power terminal 215 to the slave units 2q through the coupling connectors 211.

The Ethernet connector 214 is provided at least in the master unit 2p. The Ethernet connector 214 is connected to the main board 21. The slave units 2q perform data communication with the external computer 3 or the display device 4 through the Ethernet connector 214. That is, when the external computer 3 or the display device 4 issues a request for acquiring image data to the master unit 2p, the master unit 2p acquires image data from the slave units 2q and collectively outputs to the external computer 3 image data of the slave units 2q gathered in the master unit 2p.

As with the first embodiment, the power terminal 215 is provided only in the master unit 2p. Power is supplied from the master unit 2p to the slave units 2q through the coupling connectors 211. With such a configuration, even when using a plurality of image processing sensors, wiring of the Ethernet cable 23, a power cable and the like can be simplified, and replacement and exchange of the image processing sensors can be easily performed.

As described above, in the second embodiment, at least the master unit 2p performs data communication with the external computer 3 (display device 4) through the Ethernet connector (communication interface) 214. Therefore, processing results stored in the master unit 2p including processing results in the slave units 2q can be collectively transmitted to the external computer 3 (display device 4) at any timing.

Further, in the second embodiment, in a list of connection target controllers 2, a MAC address, an IP address and the like necessary for Ethernet communication are required at least for the master unit 2p, and not required for the slave units 2q. FIG. 12 is an exemplary diagram of the list of controllers 2 displayed in the external computer 3 of the image processing sensor system according to the second embodiment of the present invention.

In the example of FIG. 12, as with the first embodiment, controllers 2 each provided with the Ethernet connector 214 and the power terminal 215 are defined as master units 2p, and the other controllers 2 are defined as slave units 2q. The type of an imaging device 1, a MAC address, an IP address, a subnet mask, and a default gateway are displayed for each of the master units 2p. On the other hand, it is sufficient for each of the slave units 2q to display only the type of an imaging device 1. Therefore, even after performing replacement or exchange of the image processing sensors, small amount of update of setting data is sufficient.

(Third Embodiment)

The configuration of an image processing sensor according to the third embodiment of the present invention is substantially the same as that of the first and second embodiments. Therefore, elements having the same or similar functions will be denoted by the same reference signs, and detailed description thereof will be omitted. The third embodiment differs from the first and second embodiments in that a communication unit for performing data communication with an external computer 3 or a display device 4 is provided separately from a controller 2.

Figure 13:
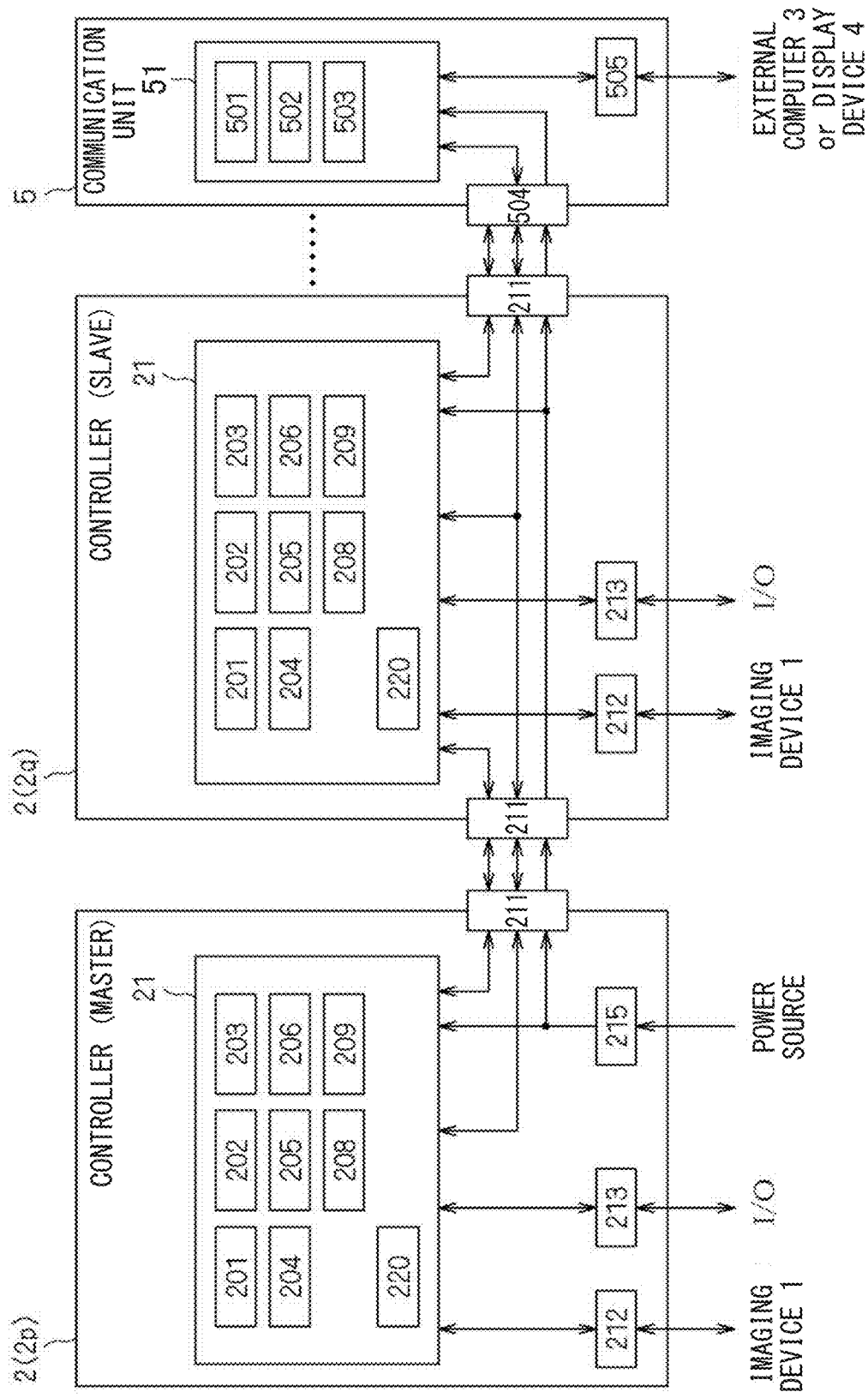
FIG. 13 is a block diagram illustrating the hardware configuration of a controller of an image processing sensor according to a third embodiment of the present invention.

FIG. 13 is a block diagram illustrating the hardware configuration of the image processing sensor according to the third embodiment of the present invention. In FIG. 13, a first controller 2p which functions as a master unit and a second controller 2q which functions as a slave unit are adjacently connected to each other, and second controllers 2q are further continuously connected in series thereto. A communication unit 5 is coupled to the last one (or an intermediate one) of the continuously connected second controllers 2q.

In FIG. 13, the first controller 2p as the master unit includes a main board 21 which includes a microcomputer, a FPGA, a DSP, a gate array or the like, and a coupling connector 211, an imaging device connector 212, an I/O connector 213 and a power terminal 215 which are all connected to the main board 21. Further, the controller 2q as the slave unit includes a main board 21, and a coupling connector 211, an imaging device connector 212 and an I/O connector 213 which are all connected to the main board 21.

The main board 21 is not limited to the configuration of the single body of a microcomputer, a FPGA, a DSP, a gate array or the like. For example, the main board 21 may be configured by combining a FPGA and a DSP or combining a DSP and a gate array, or providing a plurality of DSPs to perform parallel processing. The main board 21 is provided with, as functional blocks, a trigger control unit 201, an I/O control unit 202, a mutual interference control unit 203, an image processing unit 204, an image data storage unit 205, an image processing result storage unit 206, a setting storage unit 208, an imaging device communication control unit 209, and an inter-device communication control unit 220.

Transmission/reception of image data and processing results between the controllers 2 is performed through the inter-device communication control units 220. On the other hand, data communication with the external computer 3 (display device 4) is performed thorough the communication unit 5.

Further, the communication unit 5 includes a communication board 51 which includes a microcomputer, a FPGA, a DSP, a gate array or the like, and a coupling connector 504 and an Ethernet connector 505 which are both connected to the communication board 51.

Further, the communication board 51 is provided with, as functional blocks, an Ethernet communication control unit 501, a setting storage unit 502, and an inter-device communication control unit 503. The Ethernet communication control unit 501 controls Ethernet communication, and performs output of image data stored in the image data storage unit 205 or processing results stored in the image processing result storage unit 206 to the external computer 3 or the display device 4, transmission/reception of setting data, and the like for each of the controllers 2 connected thereto. The setting storage unit 502 collectively stores therein IP addresses, MAC addresses, setting data such as setting data of a mutual interference prevention function of the respective controllers 2. The inter-device communication control unit 503 controls data communication with the master unit 2p and the slave units 2q, and performs transmission/reception of image data and processing results with the master unit 2p and the slave units 2q.

The coupling connector 504 is coupled to a controller 2 that is adjacent thereto, and also functions as a transmission/reception path for, for example, results of image processing performed in the slave units 2q in addition to a control signal such as a mutual interference trigger signal, image data, and the like. Further, power supplied from the power terminal 215 of the master unit 2p is also supplied to the communication unit 5 through the coupling connector 504.

The Ethernet connector (another communication interface) 505 is provided only in the communication unit 5. The Ethernet connector 505 is connected to the communication board 51. When the controllers 2 perform data communication with the external computer 3 or the display device 4, processing performed by the communication board 51 of the communication unit 5 is required.

As with the first and second embodiments, the power terminal 215 is provided at least only in the master unit 2p. Power is supplied from the master unit 2p to the slave units 2q and the communication unit 5 through the coupling connectors 211. By supplying power from the master unit 2p, even when the communication unit 5 is not provided, it is possible to allow the master unit 2p and the slave units 2q to operate as image processing sensors. With such a configuration, even when using a plurality of image processing sensors, wiring of cables such as a communication cable, a power cable and the like can be simplified, and replacement and exchange of the image processing sensors can be easily performed. Further, a mutual interference prevention trigger signal (described below) may be transmitted from the communication unit 5, or may also be transmitted from the master unit 2p.

As described above, in the third embodiment, the communication unit 5 which has the Ethernet connector (another communication interface) 505 which performs data communication with the external computer 3 (display device 4) is separately provided. Therefore, the image processing sensors can perform data communication with the external computer 3 through the communication interface of the communication unit 5.

Further, in the third embodiment, in a list of connection target controllers 2, a MAC address, an IP address and the like necessary for Ethernet communication are required only for the communication unit 5, and not required for the master unit 2p and the slave units 2q. FIG. 14 is an exemplary diagram of the list of controllers 2 displayed in the external computer 3 of the image processing sensor system according to the third embodiment of the present invention.

In the example of FIG. 14, controllers 2 each provided with the power terminal 215 are defined as master units 2p, and the other controllers 2 are defined as slave units 2q. The type of the communication unit 5, the type of an imaging device 1, a MAC address, an IP address, a subnet mask, and a default gateway are displayed for the communication unit 5. On the other hand, it is sufficient for each of the controllers 2, namely, the master units 2p and the slave units 2q to display only the type of an imaging device 1. Therefore, even after performing replacement or exchange of the image processing sensors, small amount of update of setting data is sufficient.

(Fourth Embodiment)

Figure 15:
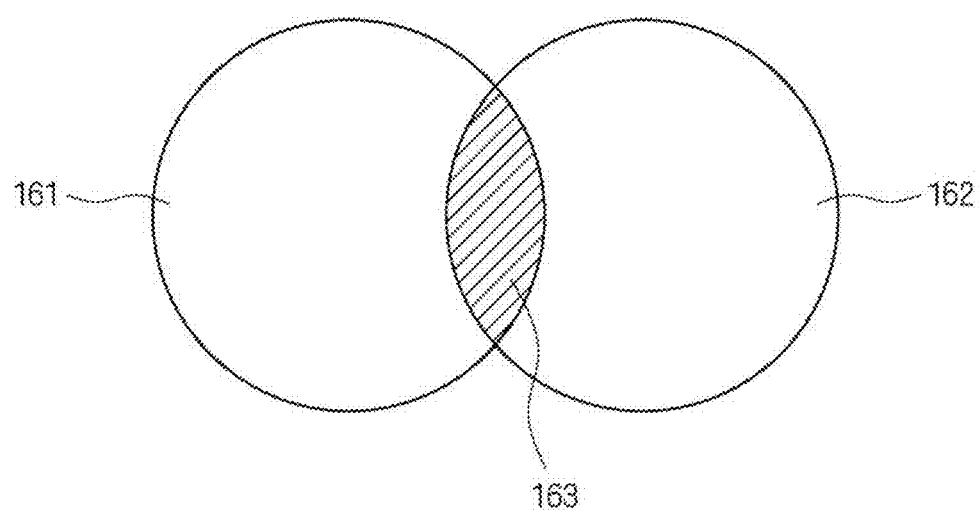
FIG. 15 is a diagram illustrating an overlapping state of projection regions of lighting of imaging devices of an image processing sensor system according to a fourth embodiment of the present invention.

The fourth embodiment of the present invention relates to a method of preventing mutual interference in the image processing sensor system described in the above first to third embodiments. FIG. 15 is a diagram illustrating an overlapping state of projection regions of lighting of imaging devices 1 of an image processing sensor system according to the fourth embodiment of the present invention. When the imaging device 1 is downsized, a plurality of imaging devices 1 are arranged adjacent to each other in many cases. When an imaging region and a projection region cannot be made small even through the imaging device 1 itself can be downsized, a phenomenon in which projection regions of imaging devices 1 overlap each other is likely to occur. In this case, a projection region 161 of one imaging device 1 and a projection region 162 of another imaging device 1 are located close to each other. As a result, a region 163 in which the projection regions of both of the imaging devices 1 overlap each other is generated.

Generally, the projection region and the imaging region are set so that the imaging region of the imaging device 1 is located within the projection region of lighting. When the projection region of one imaging device 1 overlap with the projection region of another imaging device 1 that is adjacently arranged thereto and the overlapping region 163 between the projection regions is thereby generated, the overlapping region 163 between the projection regions may overlap the imaging regions of the imaging devices 1.

Each of the image processing sensors independently functions as a single image processing sensor. Therefore, each of the image processing sensors is caused to operate so as to perform projection of lighting onto an inspection target, turn-off of lighting, imaging, and imaging processing at its own timing including adjacent image processing sensors. Even when projection regions of image processing sensors that are closely arranged overlap each other, the overlapping region 163 between the projection regions is not generated unless projection timings of lighting of the respective image processing sensors coincide with each other.

When such an overlapping region 163 between the projection regions overlaps an imaging region of an imaging device 1, so-called overexposure occur due to too bright lighting. Therefore, it is difficult to maintain the quality of an image to be picked up at a high level. Further, when light is projected onto an imaging region of one image processing sensor from another image processing sensor, the brightness in a part onto which light is projected by the other image processing sensor is too strong during imaging. Therefore, it is difficult to acquire normal image data of an inspection target.

In the fourth embodiment, in order to prevent the generation of the overlapping region 163 between projection regions regardless of the arrangement of the imaging devices 1, mutual interference prevention control is performed for adjusting turn-on and/or turn-off timings of a lighting unit 11 of an imaging device 1 and imaging timings of an imaging device 1 that is arranged adjacent or close thereto.

The configuration itself of the image processing sensor according to the fourth embodiment of the present invention is the same as that of the first to third embodiments. Therefore, elements having the same functions will be denoted by the same reference signs, and detailed description thereof will be omitted. The fourth embodiment is characterized in that a mutual interference control unit 203 which is a functional block of a controller 2 is caused to function in any of the configurations of the first to third embodiments.

Figure 16:
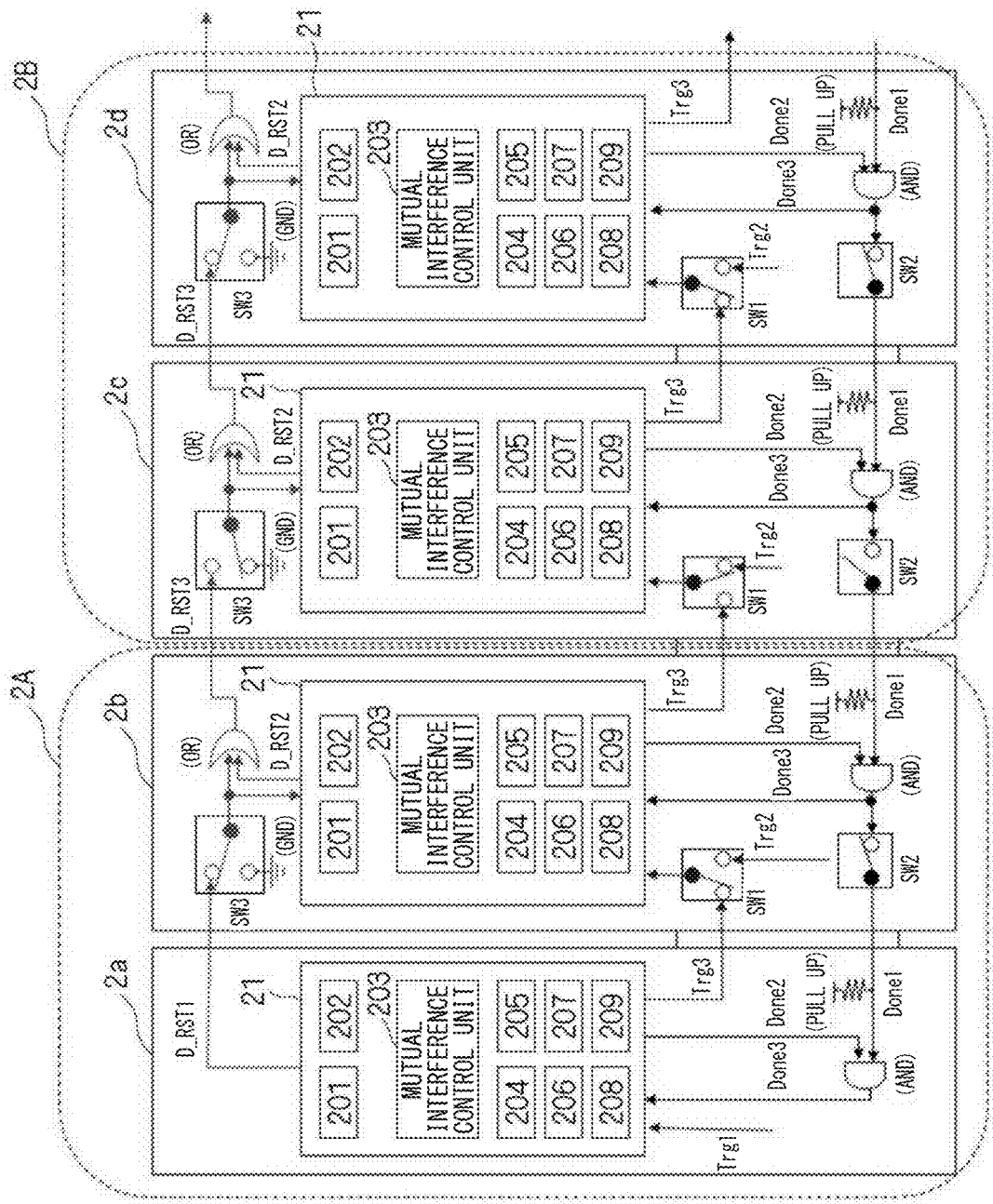
FIG. 16 is a block diagram illustrating the hardware configuration of a controller of an image processing sensor according to the fourth embodiment of the present invention.

FIG. 16 is a block diagram illustrating the hardware configuration of the controller 2 of the image processing sensor according to the fourth embodiment of the present invention. Although not illustrated in FIG. 16, as with the first embodiment, also at least in a master unit (first controller) 2p of the image processing sensor according to the fourth embodiment, an Ethernet switch 210, a coupling connector 211, an imaging device connector 212, an I/O connector 213, and a power terminal 215 are connected to a main board 21 which includes a microcomputer, a FPGA, a DSP, a gate array or the like. Further, in a second controller 2q, an Ethernet switch 210, a coupling connector 211, an imaging device connector 212, and an I/O connector 213 are connected.

The main board 21 is not limited to the configuration of the single body of a microcomputer, a FPGA, a DSP, or a gate array. For example, the main board 21 may be configured by combining a FPGA and a DSP or combining a DSP and a gate array, or providing a plurality of DSPs to perform parallel processing. The main board 21 is provided with, as functional blocks, a trigger control unit 201, an I/O control unit 202, a mutual interference control unit 203, an image processing unit 204, an image data storage unit 205, an image processing result storage unit 206, an Ethernet communication control unit 207, a setting storage unit 208, and an imaging device communication control unit 209. Detailed description for functional blocks denoted by the same reference signs as those in the first embodiment will be omitted.

The mutual interference control unit 203 transmits a mutual interference prevention trigger signal to a controller 2 that is adjacently connected thereto. That is, each of the adjacent controllers 2 generates and transmits a mutual interference prevention trigger signal when a series of processing steps including the passage of delay time, turn-on of lighting, imaging, and turn-off of the lighting is completed.

In the example of FIG. 16, four controllers 2a, 2b, 2c, and 2d are divided into a first group 2A and a second group 2B. The controllers 2a and 2b belong to the first group 2A, and the controllers 2c and 2d belong to the second group 2B.

Projection timing and imaging timing are controlled to prevent mutual interference in each of the controllers 2 of the image processing sensors or in each of the groups using a mutual interference prevention trigger signal Trg3. In the fourth embodiment, a plurality of switches SW1, SW2, and SW3 are switched to switch on/off of a mutual interference prevention function in each of the groups, thereby controlling projection timing and imaging timing using trigger signals Trg1 to Trg3.

Figure 17:
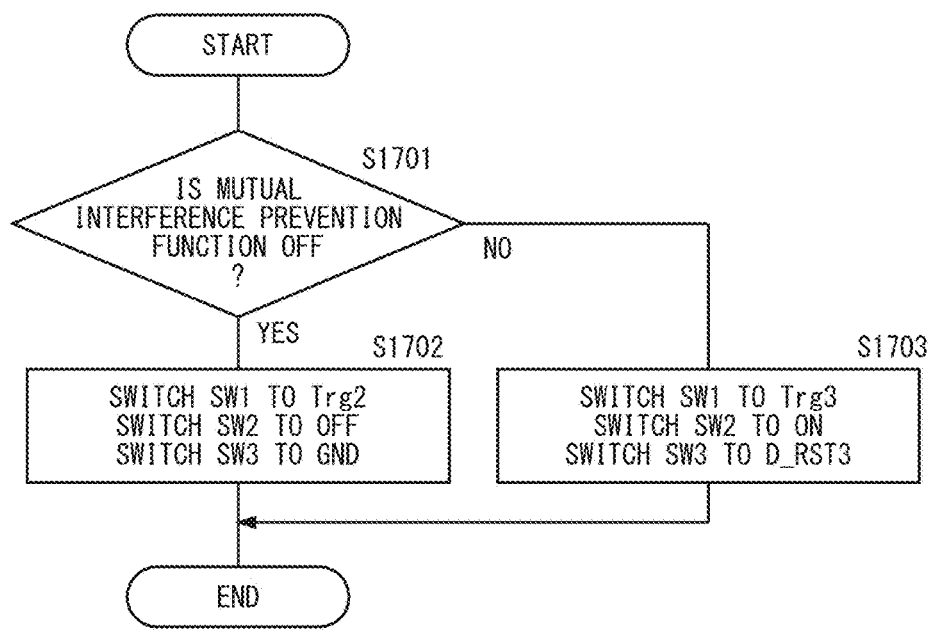
FIG. 17 is a flow chart illustrating the procedure of switch switching processing in the controller of the image processing sensor according to the fourth embodiment of the present invention.

For example, whether the mutual interference prevention function is made on state in each of the groups can be controlled by switching the switches SW1, SW2, and SW3. FIG. 17 is a flow chart illustrating the procedure of switch switching processing in the controller 2 of the image processing sensor according to the fourth embodiment of the present invention.

In FIG. 17, the controller 2 of the image processing sensor determines whether to turn off the mutual interference prevention function on the basis of information from the external computer 3 (step S1701). Here, as a case of turning off the mutual interference prevention function, it is assumed a case where a controller 2 that determines whether to turn off the mutual interference prevention function and a control target controller 2 belong to different groups.

In the example of FIG. 16, because the controller 2b belongs to the same group as that of the controller 2a as the master unit, the mutual interference prevention function thereof is turned on. Further, because the controller 2d belongs to the same group as that of the controller 2c, the mutual interference prevention function thereof is turned on.

On the other hand, because the controller 2c belongs to the group that differs from the group of the controller 2b which is connected to the master unit 2a, the mutual interference prevention function of the controller 2c is turned off.

When the controller 2 determines to turn off the mutual interference prevention function (YES in step S1701), the controller 2 switches the switch SW1 to Trg2, the switch SW2 to OFF, and the switch SW3 to GND (step S1702). In the example of FIG. 16, the mutual interference prevention function of the controller 2c is turned off.

When the controller 2 determines to turn on the mutual interference prevention function (NO in step S1701), the controller 2 switches the switch SW1 to Trg3, the switch SW2 to ON, and the switch SW3 to D_RST3 (step S1703). In the example of FIG. 16, the mutual interference prevention function is turned on in the controllers 2b and 2d.

In this manner, setting of the groups in which the mutual interference prevention function is to be used is completed. When the mutual interference prevention function is set in an unnecessarily large number of controllers 2, other pieces of processing may be delayed due to the mutual interference prevention. Therefore, a group is formed within a necessary range, and the mutual interference prevention function is made active only within the formed group. There are various methods for forming a group. For example, a group can be formed of image processing sensors whose imaging regions are close to each other, image processing sensors in which imaging devices 1 are located close to each other, or image processing sensors in which light from one lighting unit 11 may enter an imaging region or a projection region of the other lighting unit 11 so as to prevent mutual interference.

Figure 18:
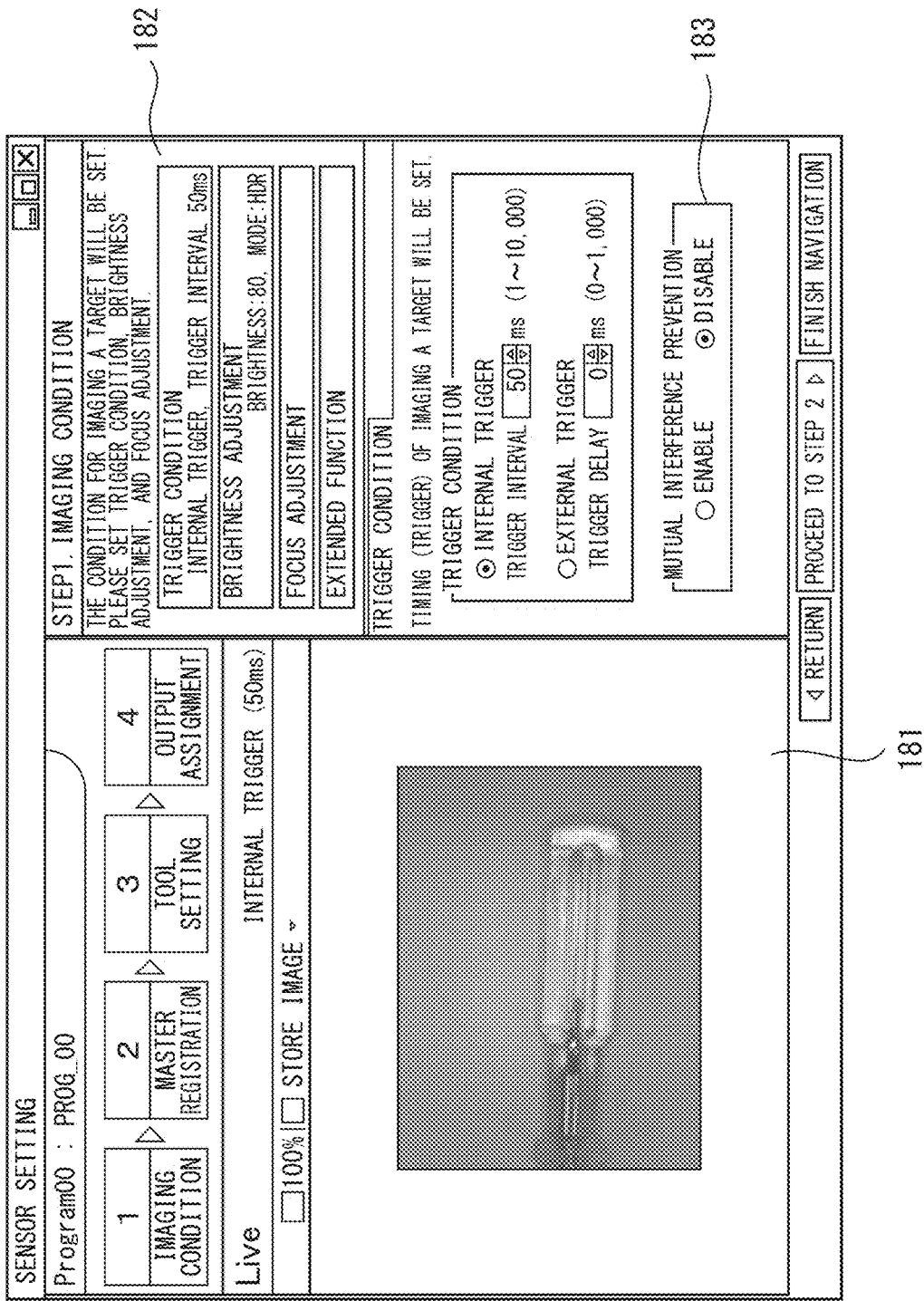
FIG. 18 is an exemplary diagram of a setting screen for turning on/off (enabling/disabling) a mutual interference prevention function in an external computer or a display device of the image processing sensor system according to the fourth embodiment of the present invention.

Setting of on/off of the mutual interference prevention function is received in a setting screen which is displayed on the external computer 3 or the display device 4. FIG. 18 is an exemplary diagram of the setting screen for turning on/off (enabling/disabling) the mutual interference prevention function in the external computer 3 or the display device 4 of the image processing sensor system according to the fourth embodiment of the present invention. As illustrated in FIG. 18, an image picked up by the selected image processing sensor is displayed in an inspection target display region 181. A user checks the displayed image and inputs whether to enable the mutual interference prevention function.

Specifically, the selection of "trigger condition" is received in an imaging condition setting region 182. An internal trigger is setting for starting imaging at a specified time interval. An external trigger is setting for starting imaging at timing inputted from the PLC or the like. In the setting of the trigger condition, a mutual interference prevention function setting button 183 for turning on/off the mutual interference prevention function is displayed. A user can set the mutual interference prevention function to an on state or an off state by selecting either an "enable" button or a "disable" button. By setting the mutual interference prevention function to be enabled or disabled in the external computer 3 or the display device 4 and transmitting the setting to the image processing sensor (controller 2), the mutual interference prevention function is set to be enabled or disabled in each of the image processing sensors.

Further, on/off of the mutual interference prevention function may be set not for each individual image processing sensor, but for all image processing sensors connected to the external computer 3 or the display device 4 collectively. FIG. 19 is an exemplary diagram of a collective setting screen for turning on/off the mutual interference prevention function in the external computer 3 or the display device 4 of the image processing sensor system according to the fourth embodiment of the present invention.

In the example of FIG. 19, a master unit and slave units No. 1, No. 2, No. 3, No. 4, and No. 5 are coupled. As illustrated in FIG. 19, a group can be set for each of the controllers 2. In the example of FIG. 19, the master unit and the slave unit No. 1 are set in a group 1, and the mutual interference prevention function is exhibited within the group 1. Further, the master unit and the slave units No. 3, No. 4, and No. 5 are set in a group 3, and the slave unit No. 2 is set in a group different from the groups 1 and 3. By setting the groups in the external computer 3 or the display device 4 in this manner and then selecting a "change setting" button illustrated in FIG. 19, a signal for setting whether to enable the mutual interference prevention function is transmitted from the external computer 3 or the display device 4 to each of the image processing sensors (controllers 2), and the controllers 2 control transmission of the control signal (mutual interference prevention trigger signal Trg3) on the basis of the transmitted signal.

Further, the trigger signal Trg2 can also be received in the I/O connector 213. Accordingly, for example, a group A can receive input of the trigger signal Trg1 from the external computer 3, and the group B can receive input of the trigger signal Trg2 from the I/O connector 213.

For example, in the example of FIG. 19, it is possible to set a group to which each of the controllers 2 belongs in the displayed order. When all of the controllers 2 are set to belong to the same group, it is necessary to prevent mutual interference between the controllers 2 within the same group. When a plurality of controllers 2 belong to the same group, the mutual interference prevention function operates within the group, and the mutual interference prevention trigger signal Trg3 is transmitted so as to prevent the interference between the image processing sensors in the group. Further, the mutual interference prevention trigger signal Trg3 is not transmitted between controllers 2 located on the boundary between adjacent two groups, specifically, between the slave unit No. 1 and the slave unit No. 2 and between the slave unit No. 2 and the slave unit No. 3 in the example of FIG. 19. This is because of that it is not necessary to prevent mutual interference between different groups.

That is, since it is not intended to prevent mutual interference as a group, the mutual interference prevention function between groups is set to off. Further, when a plurality of groups are set, the mutual interference prevention function is set to on between the groups. The set information is stored in the setting storage unit 208 in each of the controllers 2.

Figure 20:
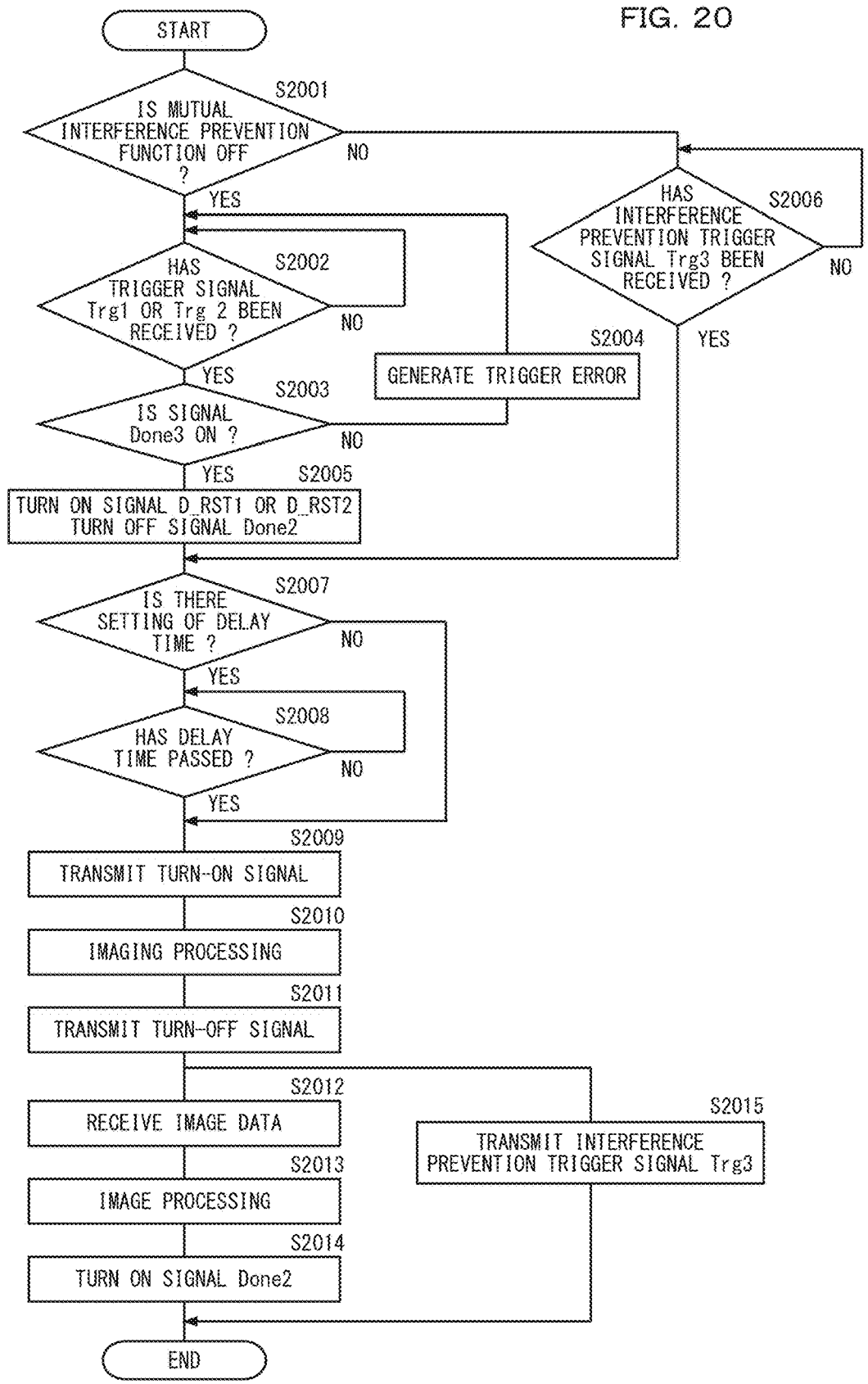
FIG. 20 is a flow chart illustrating the procedure of mutual interference prevention processing in the controller of the image processing sensor according to the fourth embodiment of the present invention.

FIG. 20 is a flow chart illustrating the procedure of mutual interference prevention processing in the controller 2 of the image processing sensor according to the fourth embodiment of the present invention. In FIG. 20, the controller 2 in the image processing sensor determines whether the mutual interference prevention function is off by referring to the setting storage unit 208 (step S2001).

When the controller 2 determines that the mutual interference prevention function is off (YES in step S2001), the controller 2 determines whether the trigger signal Trg1 or the trigger signal Trg2 has been received (step S2002). When the controller 2 determines that both of the signals have not yet been received (NO in step S2002), the controller 2 enters a reception waiting state. The trigger signal Trg1 or the trigger signal Trg2 may be generated within the controller 2, or may also be inputted from the outside.

When the controller 2 determines that the trigger signal Trg1 or the trigger signal Trg2 has been received (YES in step S2002), the controller 2 determines whether a signal Done3 is on (step S2003). When the controller 2 determines that the signal. Done3 is off (NO in step S2003), the controller 2 generates a trigger error (step S2004), and returns the processing to step S2002 to repeat the above processing.

When the controller 2 determines that the signal Done3 is on (YES in step S2003), the controller 2 turns on a signal D_RST1 or a signal D_RST2 and turns off a signal Done2 (step S2005), and proceeds the processing to step S2007.

When the controller 2 determines that the mutual interference prevention function is on (NO in step S2001), the controller 2 determines whether the mutual interference prevention trigger signal Trg3 has been received (step S2006). When the controller 2 determines that the mutual interference prevention trigger signal Trg3 has not been received (NO in step S2006), the controller 2 enters a reception waiting state.

When the controller 2 determines that the mutual interference prevention trigger signal Trg3 has been received (YES in step S2006), the controller 2 determines whether there is setting of delay time between the reception of the mutual interference prevention trigger signal Trg3 and the start of imaging (step S2007). When the controller 2 determines that there is no delay time setting (NO in step S2007), the controller 2 proceeds the processing to step S2009. When the controller 2 determines that there is the delay time setting (YES in step S2007), the controller 2 determines whether the set delay time has passed (step S2008).

When the controller 2 determines that the set delay time has not yet passed (NO in step S2008), the controller 2 enters a passage waiting state. When the controller 2 determines that the set delay time has passed (YES in step S2008), the controller 2 transmits a turn-on signal to the lighting unit 11 of the imaging device 1 (step S2009), and transmits an image processing start signal and an image processing stop signal to the imaging unit 12 to perform imaging processing (step S2010).

The controller 2 transmits a turn-off signal to the lighting unit 11 of the imaging device 1 (step S2011), receives image data (step S2012), and performs image processing (step S2013). The controller 2 turns on the signal Done2 (step S2014), and finishes the processing. Further, after transmitting the turn-off signal to the lighting unit 11 of the imaging device 1 (step S2011), the controller 2 also transmits the mutual interference prevention trigger signal Trg3 (step S2015), and finishes the processing.

The image processing in step S2013 includes keystone correction, brightness correction, and position correction of the picked-up image. As long as the mutual interference prevention trigger signal Trg3 is transmitted after imaging an inspection target (after obtaining raw image data or after finishing exposure), even when lighting of the lighting unit 11 in an adjacent imaging device 1 is started immediately after receiving the mutual interference prevention trigger signal Trg3, mutual interference does not occur.

If the mutual interference prevention trigger signal Trg3 is transmitted after finishing the image processing in step S2013, an adjacently connected image processing sensor is maintained in an imaging waiting sate after the transmission of the turn-off signal in step S2011 until the image processing is started. This is because of that the image processing in step S2013 may take a considerable amount of time. After transmitting the turn-off signal in step S2011, lighting of the lighting unit 11 is in an off state. Therefore, even when an image processing sensor which receives the mutual interference prevention trigger signal Trg3 starts imaging, light is not projected onto an imaging region of the image processing sensor from an image processing sensor adjacent thereto.

As described above, after transmitting the turn-off signal in step S2011, the mutual interference prevention trigger signal Trg3 is transmitted in step S2015. However, the timing of transmitting the mutual interference prevention trigger signal Trg3 is not particularly limited thereto. For example, lighting may be set to be turned off after the lapse of a predetermined time after turning on the lighting, and the mutual interference prevention trigger signal Trg3 may be transmitted at timing of the turning-off. Further, the lighting may be set to be turned off after the lapse of a predetermined time after starting image processing, and the mutual interference prevention trigger signal Trg3 may be transmitted at timing of the turning-off. That is, the mutual interference prevention trigger signal Trg3 is only required to be a signal that relates to the completion of light projection relating to the timing of turning off the lighting.

Figure 21:
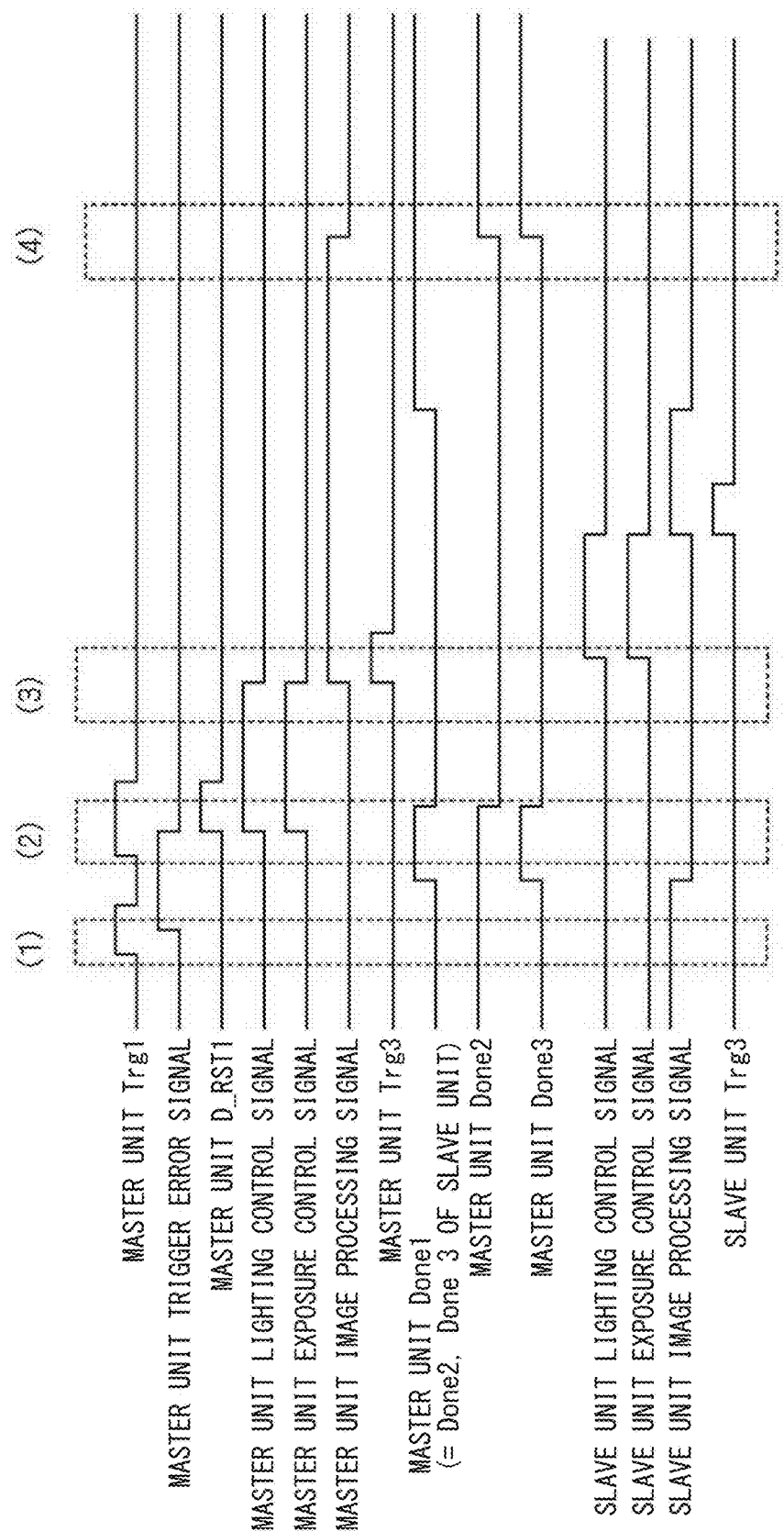
FIG. 21 is an exemplary diagram of a timing chart of various signals of the image processing sensor system according to the fourth embodiment of the present invention.

FIG. 21 is an exemplary diagram of a timing chart of various signals of the image processing sensor system according to the fourth embodiment of the present invention. In the example of FIG. 21, the timing chart when mutual interference prevention processing is performed between the master unit $2p$ and the slave unit $2q$ is illustrated.

First, at timing (1), a trigger signal Trg1 of the master unit $2p$ is turned on. However, because image processing has not been completed in the slave unit $2q$ (an image processing signal in the slave unit $2q$ is maintained in an on state), a signal Done3 of the master unit $2p$ is maintained in an off state. Therefore, a trigger error signal is turned on, and a trigger error occurs.

At timing (2), the trigger signal Trg1 of the master unit $2p$ is again turned on. Because the signal Done3 of the master unit $2p$ is maintained in an on state, a signal D_RST1 of the master unit $2p$ is turned on, and signals Done2 of the master unit $2p$ and the slave unit $2q$ are turned off. Therefore, a lighting control signal and an exposure control signal of the master unit $2p$ are turned on to start controlling an imaging device 1 of the master unit $2p$.

At timing (3), the lighting control signal and the exposure control signal of the master unit $2p$ are turned off. Further, an image processing signal of the master unit $2p$ is turned on, and a mutual interference prevention trigger signal Trg3 of the master unit $2p$ is turned on. Therefore, a lighting control signal and an exposure control signal of the slave unit $2q$ are turned on to start controlling an imaging device 1 of the slave unit $2q$.

At timing (4), the image processing signal of the master unit $2p$ is turned off while the signal Done2 of the slave unit $2q$ is being maintained in an on state. Therefore, the signal Done2 of the master unit $2p$ is turned on. Therefore, the signal Done3 of the master unit $2p$ is turned on, and a next trigger signal can be received.

As described above, in the fourth embodiment, in image processing sensors that are adjacently arranged, a controller 2 of one of the adjacent image processing sensors transmits a signal indicating the completion of imaging and projection to a controller 2 of the other image processing sensor. Further, the controller 2 of the other image processing sensor starts imaging and projection after receiving the signal. Therefore, even when imaging devices 1 of the image processing sensors are adjacently arranged, interference caused by the projection of light does not occur, and the quality of an image to be picked up is not deteriorated. Further, a group is formed of one or a plurality of image processing sensors. A controller 2 of one of the image processing sensors in the group transmits a signal indicating the completion of imaging and projection to a controller 2 of another image processing sensor in the group. Further, the controller 2 of the other image processing sensor starts imaging and projection after receiving the signal. Therefore, interference caused by the projection of light does not occur within the group, and the quality of an image to be picked up is not deteriorated.

In the fourth embodiment described above, when each of the controllers 2 is required to acquire setting data of the other controllers 2, it is sufficient to acquire the setting data on each occasion. However, of course, the master unit $2p$ may collectively acquire setting data of the slave units $2q$, and intensively manage the information.

The fourth embodiment can be applied to a case where a plurality of image processing sensors are used, and a plurality of imaging devices 1 of the image processing sensors are adjacently or closely arranged. This case includes when the imaging devices 1 are adjacently arranged so as to have contact with each other, and when the imaging devices 1 are closely arranged. The fourth embodiment can also be applied to a case where a plurality of image processing sensors do not image the same inspection target.

The present invention is not limited to the above embodiments, and various modifications and improvements can be made within the scope of the invention. For example, the present invention is not limited to the configuration in which the imaging device 1 and the controller 2 are directly connected to each other through the connection cable. It is needless to say that the imaging device 1 and the controller 2 may be connected to each other through a network such as LAN and WAN. Further, in the above embodiments, the imaging device 1 and the controller 2 are separately provided. However, an image processing sensor in which an imaging device and a controller are integrated to each other may be used as long as the image processing sensor can be downsized. In this case, it is possible to perform data communication by connecting image processing sensors to each other. Further, in the above embodiments, the power terminal 215 is provided only in the first controller $2p$ as the master unit. However, the power terminal 215 may be provided in the second controller $2q$ as the slave unit.

Further, although a DSP, a FPGA, or the like is used as the semiconductor device provided in the imaging device 1 in the above embodiments, the prevent invention is not particularly limited thereto. It is needless to say that any semiconductor device can be used as long as it can achieve the same function as above.

Further, when the mutual interference prevention trigger signal Trg3 is not transmitted between groups, as illustrated in FIG. 16, the switch SW1 is used to prevent the mutual interference prevention trigger signal Trg3 from being transmitted to an image processing sensor (controller 2) located on the first stage of another group in the fourth embodiment. However, a method of preventing the mutual interference prevention trigger signal Trg3 from being transmitted between groups is not particularly limited thereto. For example, a controller located in the last stage of a group (the controller $2b$ or the controller $2d$ in the example of FIG. 16) may not send out the mutual interference prevention trigger signal Trg3. Further, even when input of the mutual interference prevention trigger signal Trg3 is received in a controller located in the first stage of a group (the controller $2c$ in the example of FIG. 16), an imaging operation may not be performed using the received mutual interference prevention trigger signal Trg3 or on the basis of the received mutual interference prevention trigger signal Trg3. A signal relating to the completion of projecting light may be generated in the image processing sensor after the light from the image processing sensor is turned off. A signal relating to the completion of projecting light may be generated in the image processing sensor at the same time or before the light from the image processing sensor is turned off, with considering a delay of the signal transmission from the image processing sensor to the next and an afterglow of the light from the image processing sensor.

What is claimed is:

1. An image processing sensor system comprising:
a plurality of image processing sensors each including
an imaging device having an imaging unit imaging an inspection target and a lighting unit projecting light onto the inspection target,
an image processing device performing image processing on image data acquired in the imaging device and determining whether the inspection target is defective or non-defective, having a body which is separately provided from the imaging device, and connected to the imaging device with a connection cable for data communication, and
an I/O connector provided on the body of the image processing device, and wherein a result signal processed and determined by the image processing device on whether the inspection target is defective or non-defective is outputted through the I/O connector,
wherein the plurality of image processing sensors includes a first image processing sensor and a second image processing sensor which is adjacently provided to the first image processing sensor,
the image processing sensor system includes a pair of connector pins having male pin and female pin for connecting directly in mechanical and electrical contact with each other and communicating data, one of the connector pins is provided on a side surface of the body of a first image processing device of the first image processing sensor and the other one of the connector pins is provided on a side surface of the body of a second image processing device of the second image processing sensor, the side surface of the body of the second image processing device facing to the side surface of the body of the first image processing device and,
the image processing sensor system includes a communication interface provided on the body of one of the first image processing device or the second image processing device, the image data processed therein is transmitted to an external computer or display device via the communication interface,
the other one of the first image processing device or the second image processing device is configured to transmit an image data acquired in the imaging device thereof to the external computer or display device through the pair of connector pins and via the communication interface, and
the first image processing device and the second image processing device are connected directly in mechanical and electrical contact with each other through the pair of connector pins, and
wherein the first image processing sensor and the second image processing sensor are connected to each other so that data communication of data including the image data can be performed therebetween through the pair of connector pins, and the first image processing device transmits a signal relating to the completion of projecting light to the second image processing device, and
the second image processing device transmits a signal to start projecting light and imaging after receiving through the pair of connector pins the signal relating the completion of projecting light,
wherein the plurality of image processing sensors has an Ethernet switch, respectively, and
the other one of the first image processing device and the second image processing device is configured to transmit the image data to the external computer or display device via the Ethernet switch of the image processing sensor and the communication interface.

2. The image processing sensor system according to claim 1, wherein the first image processing sensor transmits the signal relating to the completion of projecting light to the second image processing sensor after completing projecting light and imaging and before starting image processing in the image processing device.

3. The image processing sensor system according to claim 1, wherein the first image processing sensor starts image processing of an image corresponding to the signal relating to the completion of projecting light after the second image processing sensor starts imaging and projection.

4. The image processing sensor system according to claim 1, wherein
the first image processing sensor transmits the signal relating to the completion of projecting light to the second image processing sensor after completing projecting light and imaging and starting image processing, and
the second image processing sensor starts projecting light and imaging after receiving the signal relating to the completion of projecting light.

5. The image processing sensor system according to claim 1, wherein
a plurality of groups each including one or a plurality of image processing sensors are formed,
the groups include at least a first group and a second group,
an image processing sensor in the first group transmits the signal relating to the completion of projecting light to another image processing sensor in the first group, and
an image processing sensor in the first group, the image processing sensor being connected to an image processing sensor of the second group, does not transmit the signal relating to the completion of projecting light to another image processing sensor, or
an image processing sensor in the second group, the image processing sensor being connected to an image processing sensor in the first group, starts projecting light and imaging independently of the signal relating to the completion of projecting light transmitted from an image processing sensor connected to the image processing sensor in the first group.

6. The image processing sensor system according to claim 1, wherein a power terminal for supplying a power to the image processing sensor is provided in a third image processing sensor and the power is supplied to the other image processing sensors via the power terminal.

7. The image processing sensor system according to claim 1, wherein the signal relating to the completion of projecting light is transmitted to the second image processing sensor so as to prevent the interference of the light from the first image processing sensor to the inspection target with the imaging of the inspection target from the second image processing sensor.

8. The image processing sensor system according to claim 1, wherein the signal relating to the completion of projecting light is transmitted such that the second image processing sensor images the inspection target without an interference with light from the first image processing sensor to the inspection target.

9. The image processing sensor system according to claim 1, wherein the function of transmitting the signal relating to the completion of the projecting light to the second image processing sensor is turned on and off from an operation of a user.

10. The image processing sensor system according to claim 9, wherein the function of transmitting the signal relating to the completion of the projecting light to the second image processing sensor is turned on from the user, if the imaging device of the first image processing sensor and the imaging device of the second image processing sensor are provided adjacently.

11. The image processing sensor system according to claim 1, wherein the first image processing sensor includes a power terminal to which power is supplied from a power source, and
the power is supplied to the second image processing sensor from the power source via the first image processing sensor.

12. The image processing sensor system according to claim 11, wherein the image data and the power and the signal relating to the completion of projecting light are transmitted through the pair of connectors.

* * * * *